US012750671B2

(12) United States Patent
Kekicheff et al.

(10) Patent No.: US 12,750,671 B2
(45) **Date of Patent: *Sep. 29, 2026**

(54) SYSTEM AND METHODS FOR DATA SECURITY USING DISTANCE MEASUREMENT

(71) Applicant: Visa International Service Association, San Francisco, CA (US)

(72) Inventors: Marc Kekicheff, Foster City, CA (US); Yuexi Chen, Foster City, CA (US); Mustafa Top, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/825,796

(22) Filed: Sep. 5, 2024

(65) Prior Publication Data

US 2024/0430683 A1 Dec. 26, 2024

Related U.S. Application Data

(63) Continuation of application No. 18/576,729, filed as application No. PCT/US2021/040898 on Jul. 8, 2021, now Pat. No. 12,114,161.

(51) Int. Cl.
*H04W 12/104* (2021.01)
*H04W 12/122* (2021.01)

(52) U.S. Cl.
CPC ....... *H04W 12/104* (2021.01); *H04W 12/122* (2021.01)

(58) Field of Classification Search
CPC ............. H04W 12/104; H04W 12/122; H04W 12/069; H04W 12/108; H04W 12/63; H04W 12/71
See application file for complete search history.

(56) References Cited

U.S. PATENT DOCUMENTS 6,715,077 B1 3/2004 Vasudevan et al.
7,003,800 B1 2/2006 Bain
(Continued)

FOREIGN PATENT DOCUMENTS

CN 111540067 A 8/2020
WO 2011131745 A1 10/2011
(Continued)

OTHER PUBLICATIONS

"IOS 14 Apple Pay: Going the Distance with UWB Touchless and QR Code Payments", Available Online at: https://atadistance.net/2020/04/01/ios-14-apple-pay-going-the-distance-with-ultra-wide-band-touchless-and-qr/, Apr. 1, 2020, 13 pages.
(Continued)

*Primary Examiner* — Aravind K Moorthy
(74) *Attorney, Agent, or Firm* — Kilpatrick Townsend & Stockton LLP

(57) ABSTRACT

Systems and methods for securing data transmissions using distance measurements are disclosed. A mobile device (such as a smart phone) and a base station can use ultra-wideband technology to determine the distance between the two devices. The distance measurements produced by the mobile device and the base station can be compared, directly or indirectly by the mobile device, the base station, and/or an access device to determine whether the mobile device is present at an access device or if the mobile device is not present at the access device (as expected during a relay attack). If the mobile device is not present at the access device, the access device can prevent or cancel an interaction based on the data transfer (e.g., opening a locked door of a secure building in response to receiving an access credential from the mobile device).

20 Claims, 7 Drawing Sheets

(56) References Cited

U.S. PATENT DOCUMENTS 7,197,639 B1 3/2007 Juels et al.
9,600,808 B1* 3/2017 Gomez, Sr. ............ G06Q 20/00
10,182,040 B2* 1/2019 Hu .......................... G06F 21/53
10,440,014 B1* 10/2019 Hoyer ................... G06F 21/445
10,475,024 B1 11/2019 Behren et al.
10,885,514 B1 1/2021 Hart et al.
11,017,398 B2* 5/2021 Potadar ................... H04L 63/10
11,093,207 B1* 8/2021 Lovelock .......... H04M 1/72454
11,429,971 B1* 8/2022 Ouellette ........... G06Q 20/4014
11,506,746 B1 11/2022 Vassilovski et al.
12,114,161 B2* 10/2024 Kekicheff ........... H04W 12/104
12,198,138 B1* 1/2025 Trinh ................. G06Q 20/3821
2002/0138740 A1 9/2002 Rumble
2002/0174345 A1* 11/2002 Patel ..................... H04L 9/3231 713/186
2003/0120926 A1 6/2003 Fukushima et al.
2003/0145203 A1 7/2003 Audebert et al.
2003/0212894 A1 11/2003 Buck et al.
2003/0233584 A1 12/2003 Douceur
2004/0121766 A1 6/2004 Benson et al.
2005/0210258 A1 9/2005 Birrell et al.
2006/0041762 A1 2/2006 Ma
2007/0101149 A1* 5/2007 Moreillon .......... H04N 21/4367 713/182
2007/0287422 A1* 12/2007 Fartmann .............. H04L 12/185 455/411
2008/0195866 A1* 8/2008 Roth ..................... H04W 12/12 713/171
2008/0208759 A1* 8/2008 Royyuru ............ G06Q 20/4012 705/72
2009/0013393 A1* 1/2009 Xi ....................... G06F 21/6209 380/282
2009/0150991 A1 6/2009 Hoey et al.
2009/0254994 A1 10/2009 Waterson
2009/0282253 A1 11/2009 Rose et al.
2009/0287678 A1 11/2009 Brown et al.
2010/0031315 A1 2/2010 Feng et al.
2010/0079338 A1 4/2010 Wooden et al.
2010/0138661 A1 6/2010 Tsai et al.
2010/0293382 A1* 11/2010 Hammad .............. H04L 9/3234 713/172
2010/0327054 A1* 12/2010 Hammad ............... G06Q 20/40 235/375
2011/0099377 A1 4/2011 Hoornaert et al.
2011/0099384 A1 4/2011 Grange et al.
2011/0208658 A1* 8/2011 Makhotin ............ G06Q 20/401 235/380
2011/0258452 A1* 10/2011 Coulier ................. H04L 9/3242 713/171
2012/0018506 A1* 1/2012 Hammad ............. G06Q 20/385 235/375
2012/0031969 A1* 2/2012 Hammad ............. G06Q 20/341 235/380
2013/0054474 A1* 2/2013 Yeager ................. G06Q 20/385 705/71
2013/0163463 A1 6/2013 Grayson et al.
2013/0232083 A1* 9/2013 Smith ................ G06Q 20/3278 705/67
2013/0314249 A1 11/2013 Le Buhan et al.
2014/0164243 A1* 6/2014 Aabye .................... G06Q 20/20 705/44
2015/0088756 A1* 3/2015 Makhotin .............. G06Q 20/12 705/71
2015/0161608 A1* 6/2015 Gilbert ............... G06Q 20/4014 705/44
2015/0163060 A1 6/2015 Tomlinson et al.
2015/0180836 A1* 6/2015 Wong ................... G06Q 20/327 713/172
2015/0186864 A1* 7/2015 Jones ................. G06Q 20/3278 705/39
2015/0199530 A1 7/2015 Thanos et al.
2015/0207630 A1* 7/2015 Shimoyama ..... G06Q 20/40145 713/186
2015/0318998 A1* 11/2015 Erlikhman .......... H04L 63/0853 713/171
2015/0327071 A1* 11/2015 Sharma ................. H04W 12/12 726/6
2015/0339664 A1* 11/2015 Wong .................. H04L 63/0823 705/71
2015/0356560 A1* 12/2015 Shastry ................ G06Q 20/401 705/64
2016/0019533 A1* 1/2016 Wu ........................ G06Q 20/20 705/67
2016/0036790 A1* 2/2016 Shastry .................. G06Q 20/32 713/168
2016/0057619 A1* 2/2016 Lopez ................ G06Q 20/3829 380/247
2016/0110711 A1* 4/2016 Collinge ............ G06Q 20/3823 705/71
2016/0125377 A1* 5/2016 Boncimino .......... G06Q 20/202 705/21
2016/0132851 A1* 5/2016 Desai ................. G06Q 20/3227 705/21
2016/0140545 A1* 5/2016 Flurscheim ........... H04L 9/3234 705/76
2016/0277380 A1* 9/2016 Wagner ............... H04W 12/069
2016/0294556 A1* 10/2016 Vortriede ................ H04L 9/321
2016/0301683 A1* 10/2016 Laxminarayanan .... H04L 67/02
2016/0314469 A1 10/2016 Lu et al.
2016/0379203 A1* 12/2016 Elhaoussine ......... G06Q 20/327 705/66
2016/0379208 A1* 12/2016 Deliwala ............ G06Q 20/3267 705/67
2017/0011406 A1* 1/2017 Tunnell ................ G06Q 20/308
2017/0017947 A1* 1/2017 Robinton ............... G06Q 20/40
2017/0063848 A1* 3/2017 Collinge ............. H04L 63/0876
2017/0076288 A1* 3/2017 Awasthi ............. G06Q 20/3821
2017/0163617 A1 6/2017 Laxminarayanan et al.
2017/0200160 A1* 7/2017 Kumar ................. G06Q 20/227
2017/0255922 A1* 9/2017 Jin ..................... G06Q 20/3224
2017/0255932 A1* 9/2017 Aabye .............. G06Q 20/38215
2017/0270528 A1* 9/2017 Prakash ............. G06Q 20/3224
2017/0272253 A1* 9/2017 Lavender .............. H04L 9/3247
2017/0346850 A1* 11/2017 Jin ........................ G06F 9/4416
2017/0357798 A1* 12/2017 Khan ................. G06Q 20/4014
2017/0373852 A1* 12/2017 Cassin .................. H04L 63/062
2018/0005227 A1* 1/2018 Sandeløv ............... G06Q 20/20
2018/0025353 A1 1/2018 Collinge et al.
2018/0041946 A1 2/2018 Park et al.
2018/0083986 A1* 3/2018 Hurley ................ H04L 63/1416
2018/0098256 A1 4/2018 Halepovic et al.
2018/0109541 A1 4/2018 Gleichauf
2018/0157481 A1 6/2018 Zessin et al.
2018/0192293 A1 7/2018 Bai et al.
2018/0197263 A1 7/2018 Pearson et al.
2018/0315038 A1* 11/2018 Rezayee ............... H04W 76/10
2019/0037527 A1 1/2019 Griffin
2019/0080319 A1* 3/2019 Carey .................... G06Q 20/36
2019/0108511 A1* 4/2019 Dunjic ................. G06Q 20/385
2019/0166488 A1* 5/2019 Park .................... H04W 12/041
2019/0238517 A1* 8/2019 D'Agostino ........ H04L 63/0428
2019/0273615 A1* 9/2019 Gordon ................. H04L 9/3228
2019/0313295 A1 10/2019 Xu et al.
2019/0370790 A1* 12/2019 Spector .............. G06Q 20/4097
2019/0384896 A1* 12/2019 Jones ...................... G06F 21/31
2019/0385161 A1* 12/2019 Gleeson ........... G06Q 20/38215
2020/0065803 A1* 2/2020 Abouelenin ......... G06Q 20/388
2020/0084625 A1 3/2020 Kosugi et al.
2020/0104474 A1* 4/2020 Duane ................ G06Q 20/4016
2020/0106756 A1* 4/2020 Osborn ................. H04L 9/0897
2020/0111095 A1* 4/2020 Osborn ................. H04L 9/3242
2020/0168229 A1* 5/2020 Manchireddy ........ H04L 9/3231
2020/0184462 A1* 6/2020 Rule ..................... H04L 9/3242
2020/0186505 A1* 6/2020 Amar .................. H04L 63/0435
2020/0198580 A1 6/2020 Saleh et al.
2020/0273037 A1* 8/2020 Phillips .................. G06Q 20/40
2020/0302436 A1* 9/2020 Ilincic ................ G06Q 20/3829
2020/0311724 A1* 10/2020 Dunjic .................. H04L 9/0819
2020/0364711 A1* 11/2020 Sarin .................. G06Q 20/3672
2020/0380591 A1* 12/2020 Rule .................. G06Q 30/0643
2020/0389490 A1* 12/2020 Rezaei ................ H04L 63/1466

(56) References Cited

U.S. PATENT DOCUMENTS

| | | | | |
|---|---|---|---|---|
| 2020/0410113 | A1* | 12/2020 | Gryb | H04L 9/302 |
| 2021/0012322 | A1* | 1/2021 | Manchanda | G06Q 20/352 |
| 2021/0042743 | A1* | 2/2021 | Green | G07F 19/206 |
| 2021/0058252 | A1 | 2/2021 | Jung et al. | |
| 2021/0067316 | A1* | 3/2021 | Bellenger | H04L 63/06 |
| 2021/0090044 | A1* | 3/2021 | Edwards | G07F 19/211 |
| 2021/0097523 | A1* | 4/2021 | Phillips | G06Q 20/3821 |
| 2021/0143896 | A1 | 5/2021 | Tao | |
| 2021/0176230 | A1* | 6/2021 | Cho | H04L 63/045 |
| 2021/0312424 | A1 | 10/2021 | Lee et al. | |
| 2022/0006636 | A1* | 1/2022 | Patterson | H04L 63/083 |
| 2022/0012765 | A1* | 1/2022 | Kannembath | G06Q 30/0233 |
| 2022/0027872 | A1* | 1/2022 | Upadhye | G06Q 40/02 |
| 2022/0067687 | A1* | 3/2022 | Hay | G07G 1/0009 |
| 2022/0131870 | A1* | 4/2022 | Mckinnon | H04L 63/105 |
| 2022/0138726 | A1* | 5/2022 | Rule | G06Q 20/352 705/71 |
| 2022/0207530 | A1 | 6/2022 | Chen et al. | |
| 2022/0216989 | A1* | 7/2022 | Sarin | G06Q 20/38215 |
| 2022/0237607 | A1* | 7/2022 | Osborn | G06Q 10/083 |
| 2022/0284178 | A1* | 9/2022 | Rule | G06F 21/35 |
| 2022/0311598 | A1 | 9/2022 | Yankilevich et al. | |
| 2022/0345309 | A1* | 10/2022 | Rule | H04W 12/069 |
| 2022/0366410 | A1* | 11/2022 | Rule | G06Q 20/3267 |
| 2022/0391896 | A1* | 12/2022 | Lei | G06Q 20/326 |
| 2022/0414648 | A1* | 12/2022 | Rule | G06N 20/00 |
| 2022/0417024 | A1* | 12/2022 | Yee | H04L 9/3234 |
| 2023/0004974 | A1 | 1/2023 | Poon et al. | |
| 2023/0081413 | A1 | 3/2023 | Takano | |
| 2023/0145683 | A1 | 5/2023 | Mandich et al. | |
| 2023/0300674 | A1 | 9/2023 | Kedalagudde et al. | |
| 2023/0318832 | A1 | 10/2023 | Patterson et al. | |

FOREIGN PATENT DOCUMENTS

| | | | |
|---|---|---|---|
| WO | 2017121452 | A1 | 7/2017 |
| WO | 2020125839 | A1 | 6/2020 |
| WO | 2020208324 | A1 | 10/2020 |

OTHER PUBLICATIONS

"NTT Docomo Taps UWB for Hands-Free Payments", Available Online at: https://www.finextra.com/newsarticle/35031/ntt-docomo-taps-uwb-for-hands-free-payments, Jan. 8, 2020, 1 page.

U.S. Appl. No. 18/576,729 , "Notice of Allowance", Jun. 7, 2024, 18 pages.

Capkun et al., "Secure Location Verification with Hidden and Mobile Base Stations", IEEE Transactions on Mobile Computing, vol. 7, No. 4, Feb. 22, 2008, pp. 1-14.

EP21748766.9 , "Intention to Grant", Jun. 12, 2024, 9 pages.

EP21748766.9 , "Office Action", Mar. 15, 2024, 5 pages.

PCT/US2021/040898 , "International Preliminary Report on Patentability", Jan. 18, 2024, 10 pages.

PCT/US2021/040898 , "International Search Report and Written Opinion", Mar. 22, 2022, 14 pages.

* cited by examiner

SYSTEM AND METHODS FOR DATA SECURITY USING DISTANCE MEASUREMENT

CROSS REFERENCE TO RELATED APPLICATIONS

This application is a continuation application of U.S. application Ser. No. 18/576,729, filed on Jan. 4, 2024, which is a National Stage of International Application No. PCT/US2021/040898, filed on Jul. 8, 2021, which are herein incorporated by reference in their entirety for all purposes.

BACKGROUND

There are a variety of applications where two devices perform a short range data transfer using radio technology. As an example, a person can use a smart card (communicating with a smart card reader) to access a secure building. In a legitimate use case, this data transfer is intentional (i.e., the data transfer is initiated by the owners or operators of the devices) and the two devices are in relatively close proximity (i.e., on the order of meters, centimeters, or millimeters, rather than kilometers).

In this exemplary legitimate use case, a person can place their smart card on a smart card reader located next to an electronically locked door of a secure building. The smart card and the card reader can communicate using radio technology, such that the smart card transfers data to the card reader. The card reader or a connected computer system can evaluate this data and determine the identity of the person. If the person is authorized to access the secure building, the card reader can transmit a signal to the electronically locked door causing the door to unlock, thereby allowing the person to access the building.

In an exemplary fraudulent use case, known as a relay attack, the smart card and the smart card reader can communicate unintentionally and over long distances. A fraudster (or team of fraudsters) can establish a communication relay between the two devices, inducing them to communicate even though they are not proximate. For example, a first fraudster can place a first radio communication device in close proximity to a legitimate user's smart card (e.g., by placing the first radio communication device next to the user's wallet containing the smart card) and a second fraudster can place a second radio communication device next to the card reader. The first radio communication device and the second radio communication device can relay communications between the smart card and the card reader, potentially causing the card reader to unlock the door to the secure building, even though an authorized user is not present. A similar example involves the use of a relay attack to gain access to a car by establishing a relay between the car's key fob and the car itself.

Such fraudulent use can have consequences. Fraudsters can perform attacks such as relay attacks in order to impersonate people, gain unauthorized access to secure facilities, steal money, etc. Thus, there is a need for secure (and relay attack resistant) methods and systems for securing data transfers, particularly during short distance radio communications.

Embodiments address these and other problems, individually and collectively.

SUMMARY

Embodiments of the present disclosure are directed to methods and systems for data security using distance measurements. Embodiments can be used to prevent fraudsters from performing fraudulent data transfers between mobile devices (e.g., smart phones, smart cards, key fobs) and access devices (e.g., point of sale (POS) terminals, building access control systems, etc.) using relay attacks.

Some embodiments can use features of ultra-wideband (UWB) communication protocols (defined by IEEE standards 802.15.4 and 802.15.4z) in order to accurately determine the distance between a mobile device and a base station. This distance measurement can be used to determine if the mobile device is actually present at an access device (as expected during a legitimate data transfer) or if the mobile device is far away from an access device (as expected during a relay attack).

After a mobile device enters a "destination area" (a defined region of space, in some cases proximate to the access device), the mobile device and a base station can initiate a UWB ranging protocol in order to determine the distance between the mobile device and the base station, producing a distance measurement. This distance measurement, along with any other relevant information, such as device identifiers, can be used by the devices (e.g., the access device, mobile device, and/or the base station) to determine whether the mobile device is relatively close to the access device or is far away from the access device. If the mobile device is close to the access device it is unlikely a relay attack is taking place. If the mobile device is far from the access device there is a reasonable chance that a relay attack is taking place.

If the mobile device is not present (e.g., the distance measurement exceeds some threshold), the mobile device and/or the access device can abort the data transfer. Alternatively, the mobile device and access device can complete the data transfer, but abort or otherwise terminate some subsequent action that takes place as a result of the data transfer.

For example, after a mobile device transfers an access token to a building control access device during a data transfer, the building control access device can unlock an electronically locked door. If the building control access device determines that the mobile device is not actually present at the building control access device, the mobile device and building control access device could still complete the data transfer, but the building control access device could simply not open the locked door. This could be useful if for example, the building control access device uses the access token to determine the identity of the corresponding user, so that the user can be contacted and informed of suspicious use of their access credentials.

As another example, a mobile device can transmit a payment credential, such as a payment account number (PAN), to an access device as part of a transaction between the user of the mobile device and a merchant operator of the access device. If the access device determines that the mobile device is far away from the access device, the access device can abort the rest of the payment process (e.g., transferring an authorization request message to an issuing bank via a payment processing network, such as VisaNet™). Alternatively, the access device can include the distance measurement (and other relevant information) in an authorization request message, enabling the payment processing network and/or an issuing bank to perform their own risk analysis and potentially deny the transaction.

In both examples, there is an incentive for a fraudster or team of fraudsters to use relay attacks. In the first case, a fraudster could use a relay attack in order to gain access to a space that they are unauthorized to access (such as a secure government facility). In the second case, a fraudster could use a relay attack in order to make a purchase using funds belonging to another individual (effectively stealing money from that other individual). However, by using UWB to determine a distance measurement, devices participating in the data transfer can determine if a relay attack is taking place. Further because of some properties of UWB communication (including the use of narrow pulses with a high pulse repetition frequency and good time domain resolution), a fraudster cannot convincingly intercept and modify communications (including distance measurements) in order to defeat the distance measurement system. As such, embodiments of the present disclosure enable secure, relay attack resistant data transfers.

One embodiment is directed to a method comprising: receiving, by a mobile device from a base station, a first transmission comprising a first session identifier; transmitting, by the mobile device to the base station, a second transmission comprising a second session identifier, wherein the base station generates a first distance measurement corresponding to a distance between the mobile device and the base station; receiving, by the mobile device from the base station, a third transmission; generating, by the mobile device, a second distance measurement corresponding to the distance between the mobile device and the base station; generating, by the mobile device, a first cryptogram, and one or more of the first session identifier, the second session identifier and/or a mobile device identifier associated with the mobile device; and transmitting, by the mobile device, a fourth transmission comprising the first cryptogram to an access device in communication with the base station, wherein the access device receives a data element from the base station, the data element generated by the base station using the first distance measurement, and one or more of the first session identifier, the second session identifier, and/or the mobile device identifier, and wherein the access device validates the first cryptogram using the data element.

Another embodiment is directed to a mobile device comprising: a processor; and a non-transitory computer readable medium coupled to the processor; the non-transitory computer readable medium comprising code, executable by the processor, for performing steps comprising: receiving, from a base station, a first transmission comprising a first session identifier; transmitting, to the base station, a second transmission comprising a second session identifier, wherein the base station generates a first distance measurement corresponding to a distance between the mobile device and the base station; receiving a third transmission; generating a second distance measurement corresponding to the distance between the mobile device and the base station; generating a first cryptogram using the second distance measurement, and one or more of the first session identifier, the second session identifier and/or a mobile device identifier associated with the mobile device; and transmitting a fourth transmission comprising the first cryptogram to an access device in communication with the base station, wherein the access device receives a data element from the base station, the data element generated by the base station using the first distance measurement, and one or more of the first session identifier, the second session identifier and/or the mobile device identifier, and wherein the access device validates the first cryptogram using the data element.

Another embodiment is directed to a method comprising: transmitting, by a base station, to a mobile device, a first transmission comprising a first session identifier; receiving, by the base station, from the mobile device, a second transmission comprising a second session identifier; generating, by the base station, a first distance measurement corresponding to a distance between the mobile device and the base station; transmitting, by the base station, to the mobile device, a third transmission, wherein the mobile device generates a second distance measurement corresponding to the distance between the mobile device and the base station; generating, by the base station, a data element using the first distance measurement, and one or more of the first session identifier, the second session identifier, and a mobile device identifier corresponding to the mobile device; and transmitting, by the base station, the data element to an access device, wherein the access device receives a fourth transmission comprising a first cryptogram generated by the mobile device using the second distance measurement, the first session identifier, the second session identifier, and the mobile device identifier, and wherein the access device validates the first cryptogram using the data element.

These and other embodiments of the disclosure are described in detail below. For example, other embodiments are directed to systems, devices, and computer readable media associated with the methods and systems described herein.

Prior to discussing specific embodiments of the present disclosure, some terms may be described in detail.

Terms

A "server computer" may include a powerful computer or cluster of computers. For example, a server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from client computers. A server computer may be a cloud computer.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

An "application" may include any computer program that is used for a specific purpose.

A "user" may include any user of some object or service. This may include, for example, a user of a "mobile device" such as a smart phone, or a user of a payment card (e.g., a credit or debit card). A user may be associated with one or more personal accounts (e.g., payment accounts) or user devices. A user may be referred to as a "cardholder" (when possessing or using a payment card), an account holder (when possessing or using an account), or a consumer (when using goods or services provided by relying entities and resource providers).

A "resource provider" may include any suitable entity that provides resources (e.g., goods, services, access to secure data, access to locations, or the like) to other entities, such as users. For example, a resource providing entity can be a merchant, a venue operator, a building owner, a governmental entity, etc. A "merchant" may be an entity that engages in transactions and can sell goods or services, or provide access to goods or services.

A "mobile device" may include any suitable electronic device that may be transported and operated by a user, which may also provide remote communication capabilities to a network. A mobile communication device may communicate using a mobile phone (wireless) network, wireless data network (e.g., 3G, 4G, 5G or similar networks), Wi-Fi™, Bluetooth®, Bluetooth® Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e., using the other device as a modem—both devices taken together may be considered a single mobile device).

An "access device" may include any suitable device for providing access to an external computer system. An access device may be in any suitable form. Some examples of access devices include point-of-sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

A "base station" may include any (typically static, land based) transceiver capable of sending and receiving radio transmissions. A base station can, for example, be used to connect a mobile device to a cellular phone network or a network such as the Internet.

An "identifier" may include data used to identify something. This may include an object, entity (such as a person or business entity), computer system, transaction, method, etc.

A "token" may be a substitute value for a credential. An "access token" may be a token used to access something. A token may be a string of numbers, letters, or any other suitable characters. Examples of access tokens include digital wallet tokens (substituting for a digital wallet credential), virtual payment account numbers (VPANs), personal identification tokens, etc.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC).

A "digital signature" may include any electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the sender.

A "cryptogram" may include any packet of encrypted data. A cryptogram may be used to securely transmit sensitive data (such as transaction data or interaction data) through a public network such as the Internet or wirelessly using radio technology (such as Bluetooth®, near field communication (NFC), etc.).

A "frame" may include a unit of data in a data transmission in a computer network. In some embodiments, a "frame" can be any unit of data transmitted in the physical layer or the data link layer in the seven-layer OSI model of computer networking. A frame may comprise a self-contained independent entity of data containing sufficient information to be routed from a source device to a destination device. A frame can be transmitted wirelessly using technologies such as, for example, Wi-Fi™, Bluetooth®, NFC, etc.

An "acquirer" may include an entity that processes payments on behalf of a resource provider, such as a merchant. An acquirer may comprise a financial institution, such as a bank, that maintains an account for a merchant. An acquirer may operate an "acquirer computer," a computer system that can be used to transmit payment information through networks such as the Internet, including, for example, authorization request messages and authorization response messages.

An "issuer" may include an entity that processes payments on behalf of a user, such as a consumer. An issuer may comprise a financial institution, such as a bank, that maintains an account for the user. An issuer may operate an "issuer computer," a computer system that can be used to transmit payment information through networks such as payment processing networks and/or the Internet, including, for example, authorization request messages and authorization response messages.

An "authorization computer" may include any computer system that performs functions associated with authorizing certain actions. For example, an authorization computer may authorize transactions between customers and merchants. An authorization computer may be operated by an "authorizing entity." An authorization computer can be an issuer computer.

A "processing network computer" may include a system that can support and deliver data services. A processing network computer can be in a "payment processing network" that may include data processing subsystems, networks, server computers and operations used to support and deliver authorization services, exception file services, and clearing and settlement services. A payment processing network may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions.

"Transaction data" may include any data that is associated with a payment transaction. Transaction data may include a transaction amount, a date of a transaction, a primary account number associated with a user initiating the transaction.

"Authentication data" may include any data suitable for verifying something. Authentication data may include data authenticating a user or a mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

An "authorization request message" may include any electronic message that requests authorization for a transaction. An authorization request message can be sent to a transaction processing computer, authorization computer, or issuer computer (associated with an issuer of a payment card) to request authorization for a transaction. An authorization request message can comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may include any electronic message that responds to an authorization request. In some cases, an authorization request message may comprise an electronic message reply to an authorization request message, and may be generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code can serve as proof of authorization.

DETAILED DESCRIPTION

Figure 1:
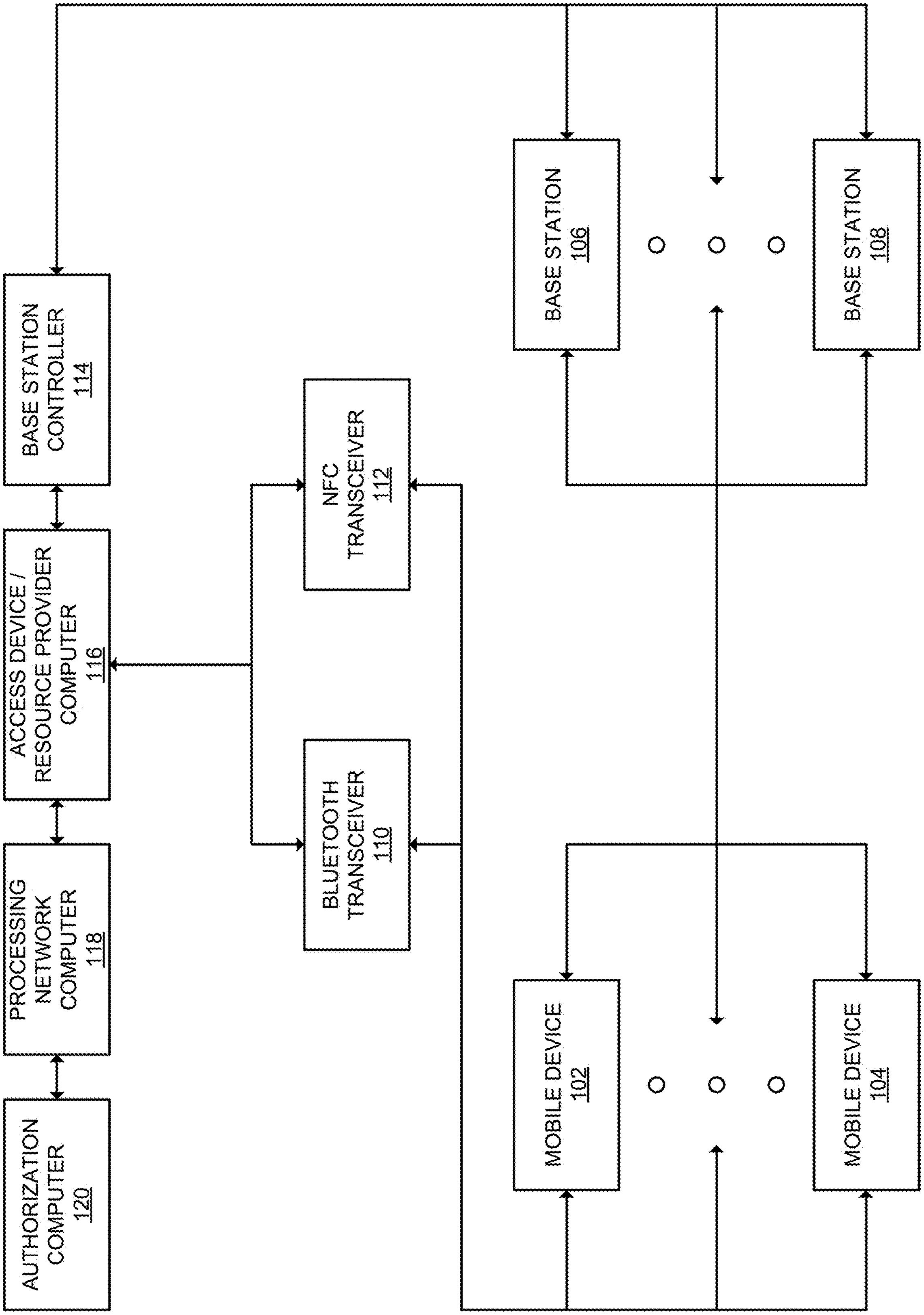
FIG. 1 shows a system block diagram of an exemplary relay attack resistant data transfer system according to some embodiments.

As summarized above, embodiments can use UWB in order to verify if a mobile device is present at an access device during or prior to a data transfer between the mobile device and the access device. In doing so, the access device and the mobile device can determine whether the data transfer is legitimate or fraudulent. The data transfer can be terminated (or not acted upon) if the mobile device is determined to be not present.

To determine if the mobile device is present or likely present, embodiments can make use of wireless ranging techniques. Although wireless ranging can be performed with many different wireless technologies (e.g., radar, sonar, etc.), embodiments use UWB technology and ranging protocols, as defined in IEEE standards 802.15.4 and 802.15.4z. Prior to describing systems and methods according to embodiments, some characteristics of UWB are described below.

UWB is a wireless communication technology characterized by short-range, high bandwidth communications. UWB has good time domain resolution because of its high bandwidth. As a result of this good time domain resolution, UWB can be used to accurately determine the distance between objects, more accurately than other wireless technologies with lower bandwidth. As an example, some UWB Doppler radar systems can detect millimeter scale movement of objects at distances of around five meters.

UWB also supports higher pulse repetition frequencies (PRFs) compared to other wireless technologies. Generally, the pulse repetition frequency relates to the rate at which UWB-capable devices transmit pulses. In one UWB mode, devices can transmit at a PRF of 128 MHz, using 16 pulses per coded bit and a 4 ns spacing. As a result, the length of UWB bursts in this mode is approximately 32 ns.

These features make UWB technology well suited for applications related to securing data using distance measurements, as described herein. The good time domain resolution enables accurate ranging, enabling embodiments to accurately determine whether a mobile device is actually present. Further, the nanosecond scale bursts and high pulse repetition make it difficult for any potential hacker to intercept and modify UWB frames. A hacker only has tens of nanoseconds to intercept, process, and transmit modified frames. This is a difficult or impossible task for current processing systems.

UWB ranging can be accomplished using techniques similar to those of other radio ranging technologies, e.g., using time of flight (ToF) measurements. Because the speed of light and the velocity factor of most transmission mediums (usually air for UWB) are known, the distance between two objects can be determine based on the amount of time it takes for one radio pulse to move from one object to the other.

For example, an access device can transmit a frame to a mobile device. When the mobile device receives the frame, the mobile device can process or interpret the frame, then transmit a response frame back to the access device. The response frame can include or otherwise communicate a processing delay $t_{process}$, corresponding to the amount of time between when the mobile device received the frame and when the mobile device transmitted the response frame.

Using the processing delay $t_{process}$ and the total time $t_{total}$ between when the access device transmitted the frame to the mobile device and when the access device received the response frame, the access device can determine the time of flight $t_{flight}$. Because a pulse travels from the access device to the mobile device, and another pulse travels from the mobile device to the access device, the difference between $t_{total}$ and $t_{process}$ is equal to twice the time of flight $t_{flight}$, and thus the time of flight can be determined using the following equation $t_{flight}=0.5(t_{total}-t_{process})$. The access device can transmit another frame to the mobile device with its own processing delay, thereby enabling the mobile device to also calculate $t_{flight}$.

Both devices can then use the time of flight to calculate the distance between the access device and the mobile device using, for example, $d=vf\cdot c\cdot t_{flight}$, where d is the distance, vf is the velocity factor and c is the speed of light in a vacuum. There are a number of variations on this technique that may become apparent to one skilled in the art. For example, timestamps could be used in place of delay values, multiple times of flight could be calculated and averaged, and/or additional terms could be introduced to improve accuracy or otherwise compensate for any issues that might be caused by the radio transmission environment (e.g., multipath interference).

Having briefly described UWB and time of flight based ranging methods, embodiments of the present disclosure can now be described in more detail. FIG. 1 shows a system diagram of an exemplary relay attack resistant data transfer system according to some embodiments. The exemplary system of FIG. 1 can comprise multiple mobile devices (e.g., mobile devices 102 and 104), multiple base stations (e.g., base stations 106 and 108), one or more wireless transceivers (such as Bluetooth® transceiver 110 and NFC transceiver 112), a base station controller 114, an access device or resource provider computer 116, a processing network computer 118, and an authorization computer 120.

Some computers or devices in FIG. 1 can be in operative communication with each other through any suitable communication channel or communication network, suitable communication networks may include any one and/or a combination of the following: A direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communication protocol such as, but not limited to, File Transfer Protocol (FTP); HyperText Transfer Protocol (HTTP); and Secure HyperText transfer Protocol (HTTPS).

Additionally, some computers or devices in FIG. 1 may communicate via any number of appropriate wireless protocols, including, for example, NFC, Bluetooth®, and UWB. As an example, a mobile device (such as mobile device 102) may communicate with an access device (or resource provider computer—these terms may be used interchangeably) 116 using Bluetooth® via a Bluetooth® transceiver 110, via NFC using an NFC transceiver 112, or via UWB via one or more base stations 106-108.

The system shown in FIG. 1 may occupy, or be distributed throughout some physical location. As an example, this physical location could comprise a retail store or outlet. Mobile devices 102-104 may move around the store with their respective owners (customers). When a customer is done shopping, they may move to a destination area, an abstract region of space that can be defined by the owner of the store. These destination areas may be located at checkout counters for example. As such, a mobile device entering one of these destination areas may indicate that a corresponding customer wishes to complete their purchase.

While in the physical location, the mobile devices 102-104 may be in periodic communication with one or more base stations 106-108. These base stations may be spread throughout the physical location for a variety of reasons. As one example, because the coverage of any one base station is limited, multiple base stations may be used to provide coverage to a larger portion of the physical location (e.g., the entirety), such that as a mobile device moves through the physical location, it can maintain UWB communication with at least one base station with high probability.

As another example, multiple base stations can be spread throughout the physical location in order to determine the location of communicating mobile devices, using geometric methods such as triangulation. The base stations 106-108 can determine the location of the mobile devices in order to determine, for example, if a mobile device has entered a destination area.

As a third example, each destination area may be associated with a particular base station, such that there are at least as many base stations as destination areas. The range of these associated base stations may be small enough that any mobile device within communication range of the associated base station is likely within the destination. Thus multiple base stations 106-108 may be spread throughout the physical location in order to allow for multiple destination areas.

Periodically, the base stations 106-108 may generate and transmit random (or pseudorandom) identifiers to the mobile devices 102-104, thereby assigning each random identifier to a respective mobile device 102-104. These random identifiers can be used to identify a particular mobile device when it enters the destination area, and can further be used to verify that the mobile device is present in the destination area or more generally in the physical location. Every so often, the base stations 106-108 can generate new random identifiers and assign the new random identifiers to the respective mobile devices (e.g., every 20 minutes). This can be advantageous because it may make it more difficult for a hacker or fraudster to defeat the relay attack resistant data transfer system, as the hacker cannot reuse an old random identifier in their attack attempt.

The base stations 106-108 may be managed, controlled, or coordinated by a base station controller 114. For example, the base station controller 114 may manage the communication pairings between base stations 106-108 and mobile devices 102-104. The base station controller 114 may also schedule the generation and distribution of new random identifiers, and aggregate any data collected by base stations 106-108 (e.g., distance measurements). The base station controller 114 may also use this data to perform some functions, such as determining the location of a mobile device using multiple distance measurements. In addition, the base station controller 114 may communicate data received from base stations 106-108 to the access device or resource provider computer 116.

Mobile devices 102-104 may communicate with access device or resource provider computer 116 via one or more transceivers, which may include a Bluetooth® transceiver 110 and an NFC transceiver 112. Additionally, mobile devices 102-104 may communicate with access device or resource provider computer 116 using UWB, via base stations 106-108. As an example, a mobile device can perform a short range wireless data transfer to the access device or resource provider computer 116 using an NFC element and the NFC transceiver. This data transfer could comprise, for example, a credential (such as a payment credential), as well as any other relevant information, such as the random identifier assigned to that particular mobile device, distance measurements, etc.

Although NFC, Bluetooth®, and UWB are relatively short range, a fraudster could conceivably perform a relay attack in order to cause a mobile device to communicate with the access device or resource provider computer 116 without the knowledge of its respective operator. In order to verify that a mobile device is present, the mobile device and a base station can calculate a distance measurement in order to determine whether the mobile device is within the physical location. The mobile device and base station can perform this distance measurement using double-sided two way ranging techniques, as described above and in more detail further below. The mobile device and the base station can share their results with the access device or resource provider computer 116, enabling the access device or resource provider computer 116 to verify whether the mobile device is present during the data transfer.

The access device or resource provider computer 116 may comprise a computer system that can process interactions (e.g., transactions) and/or grant a mobile device or a user of a mobile device access to something (for example, a good or service, access to a restricted area, etc.). In commercial applications, the access device or resource provider computer 116 may comprise a POS terminal. The access device or resource provider computer 116 can use Bluetooth® transceiver 110 or NFC transceiver 112 (which may be components of the access device or resource provider computer 116) to receive data (including, for example, payment data) from mobile devices 102-104. The access device or resource provider computer 116 can also use data such as distance measurements and random identifiers to determine whether a mobile device is present during the data transfer.

In some embodiments, particularly those where authorization for some interaction is performed off-site, the system may additionally comprise a processing network computer 118 and an authorization computer 120. For example, if the access device or resource provider computer 116 is a POS terminal, the processing network computer 118 could comprise part of payment processing network, and the authorization computer 120 could comprise a computer system associated with an issuing bank that maintains a financial account for a user of a mobile device. In this case, the access device or resource provider computer 116 can generate an authorization request message, an electronic message that request authorization to complete a transaction. The authorization request message may include payment information such as a payment credential, as well as other information, such as distance measurements, identifiers, etc. The access device or resource provider computer 116 can transmit the authorization request message to the processing network computer 118, which can subsequently forward the authorization request message to the authorization computer 120.

The authorization computer 120 can evaluate the authorization request message in order to determine whether or not to authorize the transaction. The authorization computer 120 can perform some form of risk analysis (involving, e.g., verify that a distance measurement is less than a threshold value) in order to determine whether to authorize the transaction. The authorization computer 120 can generate an authorization response message, indicating whether the transaction is authorized (or declined), then transmit the authorization response message to the processing network computer 118. The processing network computer 118 can subsequently route the authorization response message back to the access device or resource provider computer 116, enabling the access device or resource provider computer 116, or an operator of the access device or resource provider computer 116 to complete the transaction.

More details about the mobile devices 102-104, the base stations 106-108, and the access device or resource provider computer 116, including information about their components and some of their functions are described in more detail below with reference to FIGS. 2-4.

Figure 2:
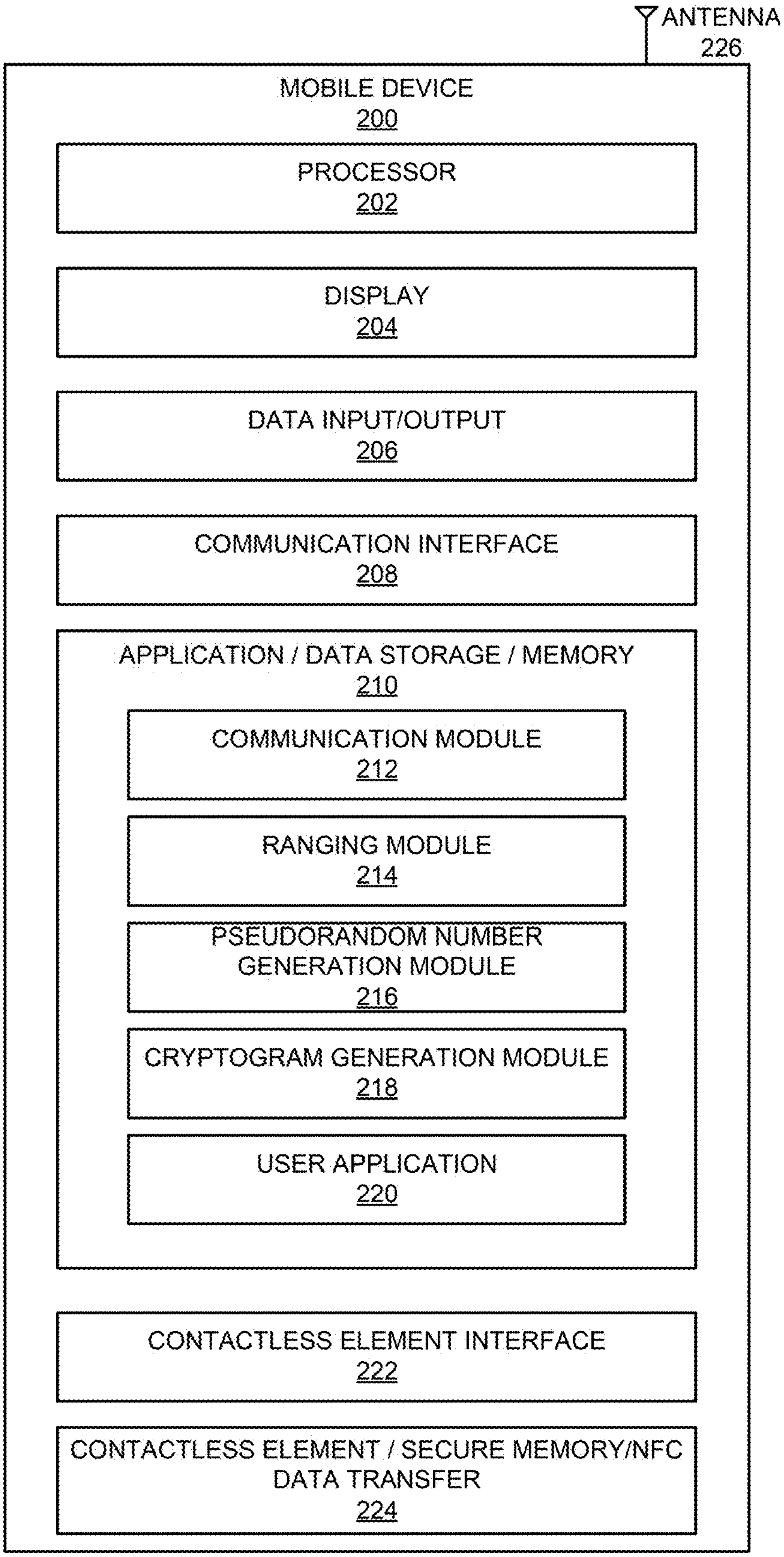
FIG. 2 shows a system block diagram of an exemplary mobile device according to some embodiments.

Mobile devices 102-104 may be better understood with reference to FIG. 2, which shows a system block diagram of an exemplary mobile device 200 according to some embodiments. As noted, cellular phones, smart cards, smart phones, wearable devices, laptop computers, or other similar devices are examples of mobile devices in accordance with embodiments. Mobile device 200 may include circuitry that is used to enable certain device functions, such as wireless communication or telephony. The functional elements responsible for enabling those functions may include a processor 202 that can execute instructions that implement the functions and operations of the device. Processor 202 may access data storage 210 (or another suitable memory region or element) to retrieve instructions or data used in executing the instructions. Data input/output element 206, such as a keyboard or touchscreen, may be used to enable a user to operate the mobile device 200 (for example, allowing the user to navigate to a user application 220). Data input/output 206 may also be configured to output data (via a speaker, for example). Display 204 may also be used to output data to a user (e.g., by displaying the data visually).

Mobile device 200 may also comprise a communications interface 208. Communications interfaces interface may 208 may be used to enable data transmission between mobile device 200 and other devices (such as a base station, an access device, and/or devices that are part of a network such as the Internet or a cellular communication network. The communication interface 208 may include any number of hardware components that enable communication according to any number of appropriate communication protocols. For example, the communication interface 208 may include a UWB integrated circuit that enables the mobile device to transmit and receive UWB frames. Likewise, in some embodiments, the communication interface 208 can include hardware components for communicating via Bluetooth®

Mobile device 200 may also include a contactless element interface 222 to enable data transfer between contactless element 224 and other components of the device. Contactless element 224 may include a secure memory and a near field communication data element (or another form of short range communication technology).

Data storage 210 may comprise a computer readable medium that may comprise a number of software modules, such as a communication module 212, a ranging module 214, a pseudorandom number generation module 216, a cryptogram generation module 218, and a user application 220.

Communication module 212 may comprise code enabling the processor 202 to implement or enable communications between the mobile device 200 and other devices, such as base stations or an access device, as well as networks such as a cellular network or the Internet. For example, the mobile device 200 can use the communication device to receive and store random identifiers, as well as The communication module 212 may allow communication according to any appropriate protocol, such as TCP, UDP, IS-IS, OSPF, IGRP, EIGRP, RIP, BGP, etc. The communication module 212 may allow secure communication by enabling the processor 202 to establish a secure or encrypted communication channel between the mobile device 200 and other devices. For example, the communication module 212 may comprise code, executable by processor 202 for performing a key exchange (such as a Diffie-Hellman key exchange) between mobile device 200 and other devices.

Ranging module 214 may comprise code or instructions, executable by the processor 202 for generating distance measurements, using, for example, a double-sided two-way ranging procedure in conjunction with one or more base stations. Ranging module 214 may enable the mobile device 200 to generate a distance measurement corresponding to the distance between the mobile device 200 and a base station based on time of flight measurements.

Pseudorandom number generation module 216 may comprise code or instructions, executable by the processor 202 for generating random or pseudorandom numbers, including random identifiers such as UWB mobile session identifiers (UMSNs, which are described in further detail below with reference to FIG. 5).

Cryptogram generation module 218 may comprise code or instructions, executable by the processor 202 for generating cryptograms using any appropriate method. For example, the mobile device 200 can generate cryptograms by encrypting random identifiers, distance measurements, and the like using a symmetric or asymmetric cryptographic key.

User application 220 may comprise an application including a GUI that enables a user to interface with the mobile device 200 or services or functions associated with the mobile device 200 and embodiments of the present disclosure. For example, the user application 220 may render information on the display 204 corresponding to distance measurements, random identifiers, and the like. The user interface 220 may, for example, display alerts to the user if the distance measurement exceeds a predetermined threshold value, indicating a potential relay attack.

It should be understood that although FIG. 2 displays an exemplary mobile device 200 comprising software modules stored on a memory element 210, a mobile device could implement some of the UWB functions described herein using hardware such as a single chip UWB transceiver (which may be part of the communication interface 208), instead of or in addition to software modules 214 and 216. For example, a UWB transceiver chip can be used to generate distance measurements using time of flight based ranging procedures instead of using ranging module 214. It should be understood further that a mobile device may lack one or more of the components shown in FIG. 2. For example, a smart card may not possess a display 204 or data input/output 206 or a tradition data storage 210.

Figure 3:
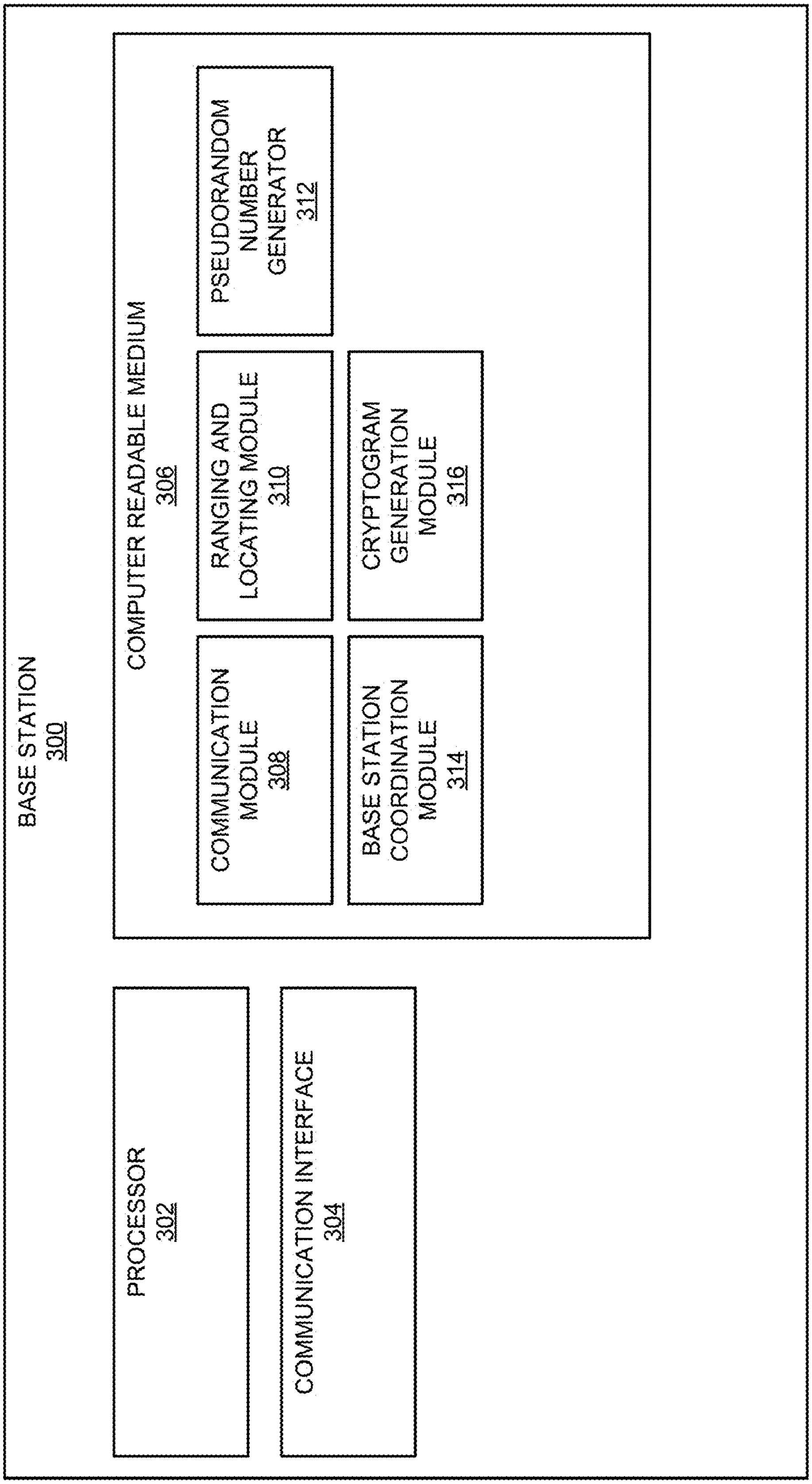
FIG. 3 shows a system block diagram of an exemplary base station according to some embodiments.

The base stations 106-108 may be better understood with reference to FIG. 3, which shows a system block diagram of an exemplary base station 300 comprising a processor 302, a communication interface 304, and a computer readable medium 306, comprising or storing a number of software modules, including a communication module 308, a ranging module 310, a pseudorandom number generator 312, and a base station coordination module 314.

Processor 302 may comprise any suitable data computation device or devices. Processor 302 may be able to interpret code and carry out instructions stored on computer readable medium 306. Processor 302 may comprise a Central Processing Unit (CPU) operating on a reduced instructional set, and may comprise a single or multi-core processor, or any other appropriate processing unit. Processor 302 may also include an Arithmetic Logic Unit (ALU) and a cache memory.

Communication interface 304 may comprise any interface by which base station 300 can communicate with other computers or devices. Examples of communication interfaces include wired interfaces, such as USB, Ethernet, or FireWire, as well as wireless interfaces such as Bluetooth®, Wi-Fi™, NFC, or UWB transceivers (including, for example, a UWB transceiver integrated circuit (IC)). Base station 300 can possess multiple communication interfaces 304. As an example, base station 300 may communicate with a mobile device via a UWB interface and via a base station controller via an Ethernet interface or a USB port.

Communication module 308 may comprise code, software or instructions that may be interpreted and executed by processor 302. This software may be used by base station 300 in order to communicate with other computers and devices, such as mobile devices 102-104 and base station controller 114 in FIG. 1. This may include code or instructions for transmitting cryptograms or other data elements to an access device, transmitting UWB frames to a mobile device, etc. Communication module 308 may enable base station 300 to communicate with other computers and devices according to any appropriate communication protocol.

Ranging and locating module 310 may comprise code or instructions, executable by the processor 302 for performing functions associated with determining distance measurements and locating mobile devices. For example, the ranging and location module 310 may comprise code enabling the base station 300 to perform a double-sided two-way ranging procedure with a mobile device. The ranging and location module 310 may also comprise code enabling the base station 300 to triangulate the location of a mobile device in conjunction with other base stations in a base station network.

Pseudorandom number generator 312 may comprise code or instructions, executable by processor 302 for generating random and pseudorandom numbers using any appropriate method or algorithm. These random or pseudorandom numbers can include mobile device identifiers and UWB base session numbers (UBSNs, as described in further detail with reference to FIG. 5).

Base station coordination module 314 may comprise code or instructions, executable by processor 302 for interpreting commands, instructions, or other data from a base station controller, including instructions to communicate with, or determine the distance to a particular mobile device, as well as instructions to generate new mobile device identifiers, among other such instructions.

Cryptogram generation module 316 may comprise code or instructions, executable by the processor 302 for generating cryptograms using any appropriate method. For example, the base station 300 can generate cryptograms by encrypting random identifiers, distance measurements, and the like using a symmetric or asymmetric cryptographic key.

It should be understood that although FIG. 3 displays an exemplary base station 300 comprising software modules stored on a computer readable medium 306, a base station could implement some of the UWB functions described herein using hardware such as a single chip UWB transceiver (which may be part of the communication interface 304), instead of or in addition to software modules 310-314. For example, a UWB transceiver chip can be used to generate distance measurements using time of flight based ranging procedures, while a software module such as ranging and locating module 310 implements an algorithm or method used to localize an object (such as a mobile device) in space based on the distance measurements generated by the UWB transceiver chip.

Figure 4:
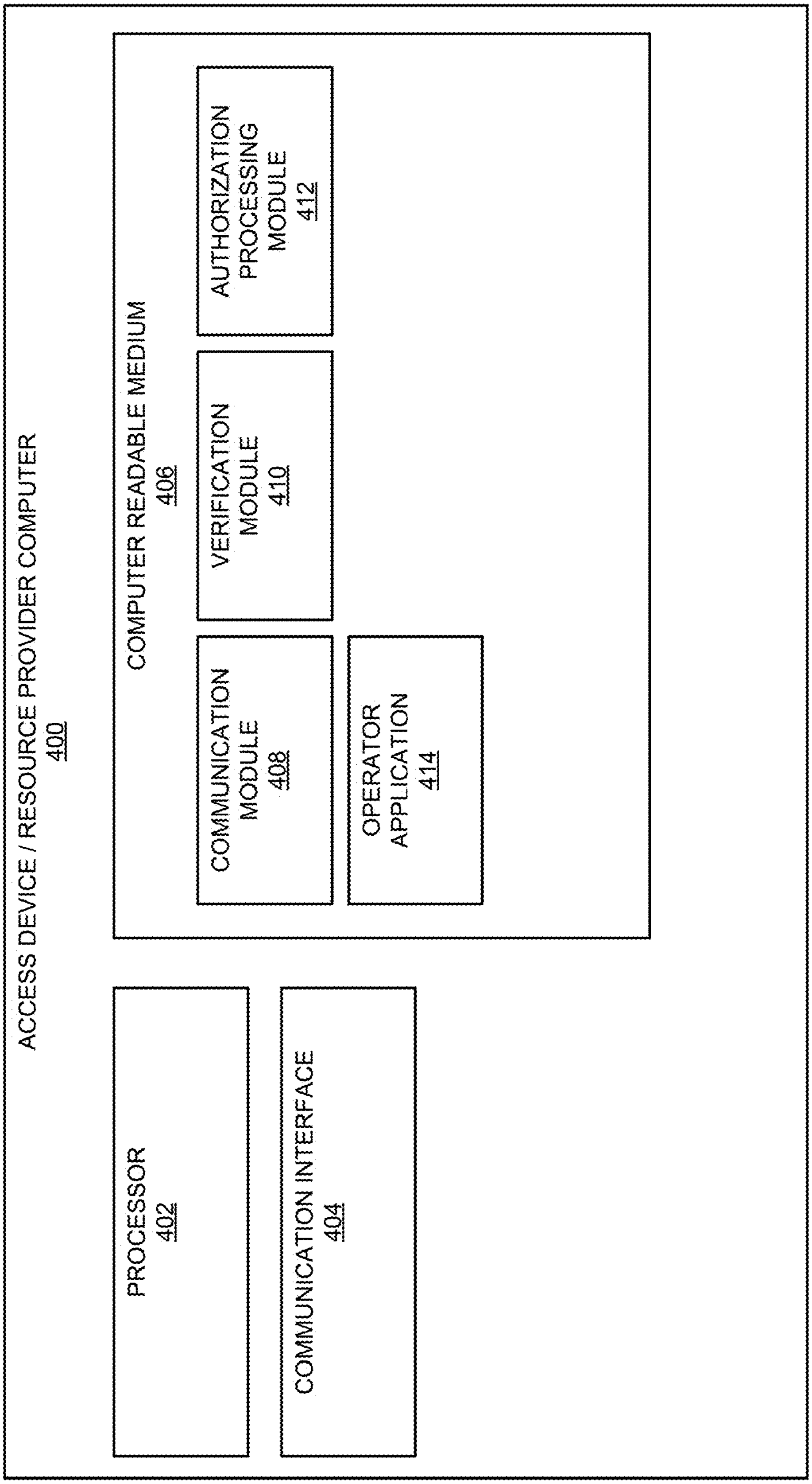
FIG. 4 shows a system block diagram of an exemplary access device/resource provider computer according to some embodiments.

The access device or resource provider computer 116 may be better understood with reference to FIG. 4, which shows a system block diagram of an exemplary access device or resource provider computer 400 comprising a processor 402, a communication interface 404 and a computer readable medium 406, comprising or storing a number of software modules, including a communication module 408, a verification module 410, an authorization processing module 412, and an operator application 414.

Communication interface 404 may comprise any interface by which access device or resource provider computer 400 can communicate with other computers or devices. Examples of communication interfaces include wired interfaces, such as USB, Ethernet, or FireWire, as well as wireless interfaces such as Bluetooth®, Wi-Fi, or NFC transceivers. Access device or resource provider computer 400 can possess multiple communication interfaces 404. As an example, access device or resource provider computer 400 may communicate with a mobile device via a Bluetooth® transceiver or an NFC transceiver and a processing network computer via an Ethernet interface.

Communication module 408 may comprise code, software or instructions that may be interpreted and executed by processor 402. This software may be used by access device or resource provider computer 400 in order to communicate with other computers and devices, such as mobile devices 102-104, base station controller 114, and processing network computer 118 in FIG. 1 This may include code or instructions for receiving and interpreting messages or other transmissions from base stations and mobile devices, including UWB frames. Communication module 408 may enable access device or resource provider computer 400 to communicate with other computers and devices according to any appropriate communication protocol.

Verification module 410 may comprise code or instructions, executable by processor 402 for verifying cryptograms or other data received from mobile devices and base stations. For example, access device or resource provider computer 400 can compare cryptograms received from mobile devices and base stations in order to verify that both devices produced consistent distance measurements. Verification module 410 can also be used to compare a distance measurement to a predetermined distance threshold, in order to verify that a mobile device is present during a data transfer.

Authorization processing module 412 may comprise code or instructions, executable by processor 402 for authorizing some interaction based on a data transfer between the mobile device and the access device or resource provider computer 400. For example, If the access device 400 comprises a system used to control access to a secure building, the authorization processing module 412 may comprise code used to verify a credential used to access the secure building and/or to transmit signals unlocking a door to the secure building. In transaction based systems, the authorization processing module 412 may comprise code or instructions, executable by processor 402 for generating and transmitting authorization request messages, and receiving and interpreting authorization response messages.

Operator application 414 may comprise code or instructions, executable by processor 402 for enabling an operator of access device 400 to interface with the access device 400. For example, in a transaction based system, operator application 414 may comprise a point of sale application.

Figure 5:
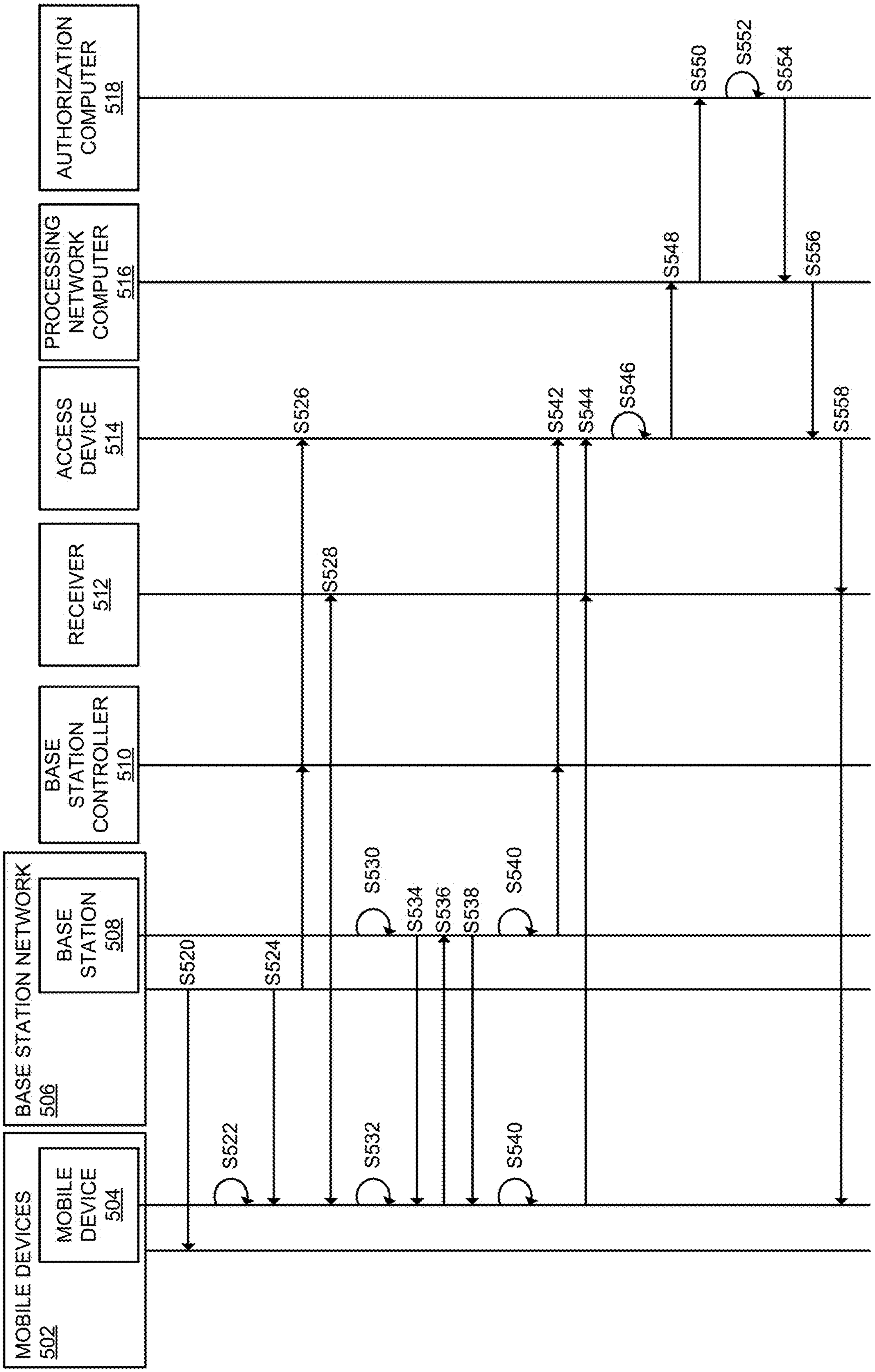
FIG. 5 shows a sequence diagram of an exemplary secure data transfer method according to some embodiments.

FIG. 5 shows a sequence diagram of an exemplary method of securing a data transfer performed between a mobile device 504 and an access device 514 according to some embodiments.

As described above, a plurality of mobile devices 502, located within some physical location can periodically communicate with a plurality of base stations that are part of a base station network 506. These communications may include random mobile device identifiers, periodically generated by the base station network and transmitted and assigned to mobile devices 502.

At step S520, the mobile devices 502 (including mobile device 504) can receive, from the base station network 506, transmissions comprising mobile device identifiers, wherein the mobile device identifiers comprise random identifiers generated by the base station network 506. Base stations in the base station network 506 (such as base station 508) or the base station controller 510 may generate these mobile device identifiers using any appropriate random or pseudorandom number generator. These mobile device identifiers can be used to identify and distinguish between mobile devices, for example, when mobile device 504 is performing a data transfer with the access device 514. The mobile devices 502 may store their respective mobile device identifiers in a memory element, such as data storage 210 shown in FIG. 2.

Periodically, the base stations in the base station network 506 can generate new mobile device identifiers according to a predetermined schedule or time interval (e.g., every 20 minutes). As such, mobile devices 502 can periodically receive one or more subsequent transmissions after a predetermined time interval, the one or more subsequent transmissions comprising a subsequent mobile device identifier comprising a subsequent random identifier generated by the base station network 506. The mobile devices can store these subsequent device identifiers in their respective memory elements.

At step S522, a mobile device 504 can enter a destination area. This could comprise, for example, a region of space located close to the access device 514 or a receiver 512 corresponding to the access device 514. The destination area could comprise be located close to a checkout counter (in commerce-based uses of embodiments) or close to a secure facility, such as an access controlled apartment complex, or any other suitable location.

At step S524, the base stations in the base station network 506 can determine that the mobile device 504 has entered the destination area. There are several ways in which this can be accomplished. In some embodiments, the destination area may be located proximate to a short range base station (such as base station 508). Communications between the base station 508 and mobile device 504 may indicate that the mobile device has entered the destination area.

As an example, the mobile device 504 may periodically broadcast or otherwise transmit an initial transmission establishing communication with base stations such as base station 508. This initial transmission may comprise the mobile device identifier associated with the mobile device 504. The initial transmission may inform base stations that the mobile device has entered into communication range. This initial transmission may indicate that the mobile device has entered into the destination area.

Alternatively, base stations in the base station network can locate the mobile device 504 using methods such as triangulation. The base stations can determine a location associated with the mobile device 504 by performing a locating process with a plurality of other base stations in the base station network 506. Afterwards, the base stations can determine that the mobile device is in the destination area based on the location associated with the mobile device 504. This location process could comprise, for example, determining the distance between the mobile device 504 and multiple base stations in the base station network 506, and determining the location associated with the mobile device 504 using these measurements.

At step S526, once the base station network 506 has determined that mobile device 504 has entered the destination area, the base station network 506 (or a particular base station, such as base station 508) can transmit, to the access device 514, via the base station controller 510, a message indicating that the mobile device 504 is in the destination area. This transmission may indicate to the access device 514 to expect a subsequent data transfer from the mobile device 504.

At step S528, the mobile device 504 can establish communication with the access device 514 via a receiver 512. This receiver 512 could comprise, for example, a Bluetooth®, NFC, or UWB receiver over which the data transfer can take place. In some embodiments, a UWB receiver may comprise a base station, such as base station 508. Step S528 can comprise, an initial exchange of messages (such as handshaking messages, key exchanges, etc.) used to establish a wireless communication link between two devices.

At step S530, the base station 508 can generate a UWB base session number (UBSN), sometimes referred to as a first session identifier. The first session identifier can comprise a first random number or first random identifier generated by the base station 508, using any appropriate random or pseudorandom number generator. The UBSN can be used by a device such as access device 514 to verify distance measurements determined by the base station 508 and the mobile device 504, e.g., verifying that a legitimate base station 508 (not an imposter) performed the distance measurement process.

At step S532, the mobile device 504 can generate a UWB mobile session number (UMSN), sometimes referred to as a second session identifier. The second session identifier can comprise a second random number or second random identifier generated by the mobile device 504, using any appropriate random or pseudorandom number generator. The UMSN can be used by a device such as access device 514 to verify distance measurements determined by the base station 508 and the mobile device 504, e.g., verifying that a legitimate mobile device 504 (not an imposter) performed the distance measurement process.

Steps S534-S540 can comprise a distance measurement process enabling the mobile device 504 and the base station 508 to determine the distance between the two devices. This distance measurement process can comprise a double-sided two-way ranging process, as described above. The mobile device 504 and the base station 508 can exchange (at least) three UWB transmissions (sometimes referred to as a first transmission, a second transmission, and a third transmission) in order to establish the distance between the two devices.

At step S534, the base station 508 can transmit a first transmission comprising the first session identifier (i.e., the UBSN) to the mobile device 504. The first transmission may comprise a UWB transmission comprising a UWB frame.

At step S536, the mobile device 504 can transmit a second transmission comprising the second session identifier (i.e., the UMSN) and a first processing time value to the base station 508. The second transmission may comprise a UWB transmission comprising a UWB frame. The first processing time value may correspond to a first amount of time elapsed between when the mobile device 504 received the first transmission (i.e., at step S534) and transmitted the second transmission.

At step S538, the base station 508 can transmit a third transmission comprising a second processing time value (and optionally the first session identifier) to the mobile device 504. The third transmission may comprise a UWB transmission comprising a UWB frame. The second processing value may correspond to a second amount of time elapsed between when the base station 508 received the second transmission (i.e., step S536) and when the base station 508 transmitted the third transmission.

At step S540, the base station 508 can generate a first distance measurement corresponding to the distance between the mobile device 504 and the base station 508 using the first processing time value. The base station 508 can, for example, determine the time of flight based on the first processing time value and a total amount of time elapsed, then determine the first distance measurement based on the time of flight, as described above.

Likewise at step S540, the mobile device 504 can generate a second distance measurement corresponding to the distance between the mobile device 504 and the base station 508 using the second processing time value. The mobile device 504 can, for example, determine the time of flight based on the second processing time value and a total amount of time elapsed, then determine the second distance measurement based on the time of flight, as described above.

Additionally at step S540, the mobile device 504 can generate a first cryptogram using the second distance measurement, and one or more of the first session identifier (UBSN), the second session identifier (UMSN), and/or the mobile device identifier (i.e., the random identifier assigned to the mobile device 504). Two or more of these values can be concatentated together and encrypted or otherwise cryptographically processed (e.g., hashed using a hash function such as SHA-1) to generate the cryptogram. Including the session identifiers and/or the mobile device identifier in the first cryptogram can tie the cryptogram to the particular devices and the session in which they are communicating. In some embodiments, the first cryptogram can also be generated using an account identifier in addition to the second distance measurement, the first session identifier, the second session identifier, and the mobile device identifier. This account identifier may correspond to an account associated with the user of the mobile device 504, such as a payment account number. Including the account identifier in the first cryptogram can tie the cryptogram to the particular account used to conduct the transaction. In some cases, the cryptogram can be an EMV (Europay, MasterCard, Visa) cryptogram that is used in an interaction between a payment device and a POS terminal. The mobile device 504 can generate the first cryptogram in any appropriate manner, for example, by encrypting the listed data using a symmetric or asymmetric cryptographic key.

Prior to generating the first cryptogram, the mobile device 504 can compare the second distance measurement to a predetermined distance threshold, in order to determine whether the mobile device 504 is present in the destination area or may be the victim of a relay attack. If the mobile device 504 determines that the second distance measurement is greater than the predetermined distance threshold, the mobile device 504 may abort the data transfer between itself and the access device 514.

Additionally, prior to generating the first cryptogram, the mobile device 504 can truncate the second distance measurement (e.g., by removing or blanking some number of least significant bits associated with the second distance measurement). This truncation process may address any error that was introduced to the second distance measurement, and may enable the second distance measurement and the first distance measurement to be compared more effectively in a subsequent step.

Also at step S540, the base station 508 can generate a data element using the first distance measurement, the first session identifier, the second session identifier, and the mobile device identifier. In some embodiments, the data element can additionally comprise the account identifier. In some embodiments the data element can comprise an ordered list or tuple comprising the data mentioned above. Such data could also be concatenated together and optionally truncated or altered. In other embodiments, the data element can comprise a second cryptogram. The base station 508 can generate the second cryptogram in any appropriate manner, for example, by encrypting the listed data using a symmetric or asymmetric cryptographic key.

Prior to generating the data element, the base station 508 can compare the first distance measurement to a predetermined distance threshold, in order to determine whether the mobile device 504 is present in the destination area or may be the victim of a relay attack. If the base station 508 determines that the first distance measurement is greater than the predetermined distance threshold, the base station 508 can transmit a warning message to the access device 514 (via for example, base station controller 510). The warning message can indicate that the first distance measurement exceeds the predetermined distance threshold. The access device 514 can abort or otherwise not participate in the subsequent data transfer upon receiving the warning message.

Additionally, prior to generating the data element, the base station 508 can truncate the first distance measurement (e.g., by removing or blanking some number of least significant bits associated with the first distance measurement). This truncation process may address any error that was introduced to the first distance measurement, and may enable the second distance measurement and the first distance measurement to be compared more effectively in a subsequent step.

At step S542, the base station 508 can transmit the data element to the access device 514, via, for example, the base station controller 510.

Likewise, at step S544, the mobile device 504 can transmit a fourth transmission, which can be the first transmission to the access device 514, via, for example, receiver 512. The fourth transmission can comprise a UWB transmission, comprising a UWB frame, and the receiver 512 can comprise either the base station 508 or a UWB transceiver. Alternatively, the fourth transmission can comprise either an NFC transmission or a Bluetooth® transmission. If the first cryptogram was generated using the account identifier, the fourth transmission can additional comprise the account identifier, enabling the access device 514 to verify the first cryptogram in a subsequent step.

At step S546, the access device 514 can verify the first cryptogram (received from the mobile device 504) using the data element (received from the base station 508. In some embodiments, the access device 514 can validate the first cryptogram using the account identifier in addition to the data element. For example, the access device 514 can generate a second cryptogram using the data contained in the data element and the account identifier, then compare the first cryptogram to the second cryptogram (e.g., perform an equality check). Alternatively, if the data element comprises a second cryptogram, the access device 514 can verify the first cryptogram by comparing it directly to the second cryptogram, without generating its own second cryptogram.

The cryptogram verification process can enable the access device 514 to effectively determine whether the information produced by the mobile device 504 and the base station 508 during the distance measurement process (e.g., the distance measurement, UBSN, UMSN, etc.) is consistent. If these values are consistent, it is unlikely that a hacker or other form of fraudster intercepted or otherwise disrupted the distance measurement process. As such, there is a relatively high likelihood that either the mobile device 504 is in the destination area, or that a relay attack can be detected (e.g., by comparing the distance measurement to a predetermined distance threshold).

Additionally, at step S546, the access device 514 can compare the first distance measurement and the second distance measurement to a predetermined distance threshold, in order to verify that the mobile device 504 is in the destination area, and not a victim of a relay attack. If the access device 514 determines that either distance measurement is greater than the predetermined distance threshold, the access device 514 can terminate the remainder of the data transfer process, e.g., by not generating and transmitting an authorization request message, as described below.

If the data contained in the first cryptogram and the data element match, and the mobile device 504 is present, the access device can generate an authorization request message based on the first cryptogram and the account identifier. The authorization request message can request authorization for an interaction (e.g., a transaction) between the mobile device 504 (or its operator) and the access device (or its operator). The account identifier may comprise a payment account number, and the authorization request message may request authorization from an authorization computer 518, such as a computer associated with an issuing bank that maintains a payment account on behalf of an operator of mobile device 504. The authorization request message can comply with ISO 8583, which is a standard for systems that exchange electronic transaction information associated with a payment made by a user using a payment device or payment account. The authorization request message can contain information such as the first cryptogram, the data element, as well as the results of any comparisons between the information contained in the first cryptogram or the data element (e.g., whether either distance measurement exceeds a predetermined distance threshold).

At step S548, the access device 514 can begin transmitting the authorization request message to authorization computer 518 via processing network computer 516 by transmitting the authorization request message to processing network computer 516. The processing network computer 516 can comprise, for example, a computer system associated with a payment processing network.

At step S550, the processing network computer 516 can forward the authorization request message to authorization computer 518. In some embodiments the processing network computer 516 can perform additional functions, such as functions associated with de-tokenization (e.g., replacing a (token) account identifier with a non-token account identifier before transmitting the authorization request message to the authorization computer 518). The processing network computer 516 can also verify the cryptograms, and or compare the distance measurements to predetermined threshold values, as described above.

At step S552, the authorization computer 518 can evaluate the authorization request message and generate an authorization response message. The authorization response message can indicate whether or not the authorization computer 518 has approved or denied an interaction (e.g., a transaction) between the mobile device 504 and the access device 514. The authorization computer 518 can evaluate the authorization request message by evaluating the data stored therein e.g., by comparing any distance measurement to a predetermined distance threshold. The authorization computer 518 can also evaluate the account identifier and an account associated with the account identifier, e.g., verifying that the account contains enough funds to complete a transaction.

At step S554, the authorization computer 518 can transmit the authorization response message to the processing network computer 516.

At step S556, the access device 514 can receive the authorization response message from the authorization computer 518 via the processing network computer 516. Depending on the contents of the authorization response message (e.g., if it indicates that the interaction has been approved), the access device 514 can complete an interaction (e.g., a transaction) with the mobile device 504. As an alternative example, the access device 514 could complete an interaction by granting a user of the mobile device 504 access to an access controlled building.

At step S558, the mobile device 504 can receive a response message from the access device 514. The response message can correspond to the authorization response message and indicate whether an interaction between the mobile device 504 and the access device 514 has been approved by the authorization computer. In transaction based applications, the response message may comprise receipt information. It may also comprise value-added services, such as coupons, discounts, loyalty points, surveys, etc. The response message may also comprise the first distance measurement and/or the second distance measurement and/or a summary of the distance measurements. The response message can comprise a UWB, NFC, or Bluetooth® frame.

At a later time, a clearing and settlement process between the authorization computer and a transport computer associated with the resource provider can take place to clear and settle the transaction.

Figure 6:
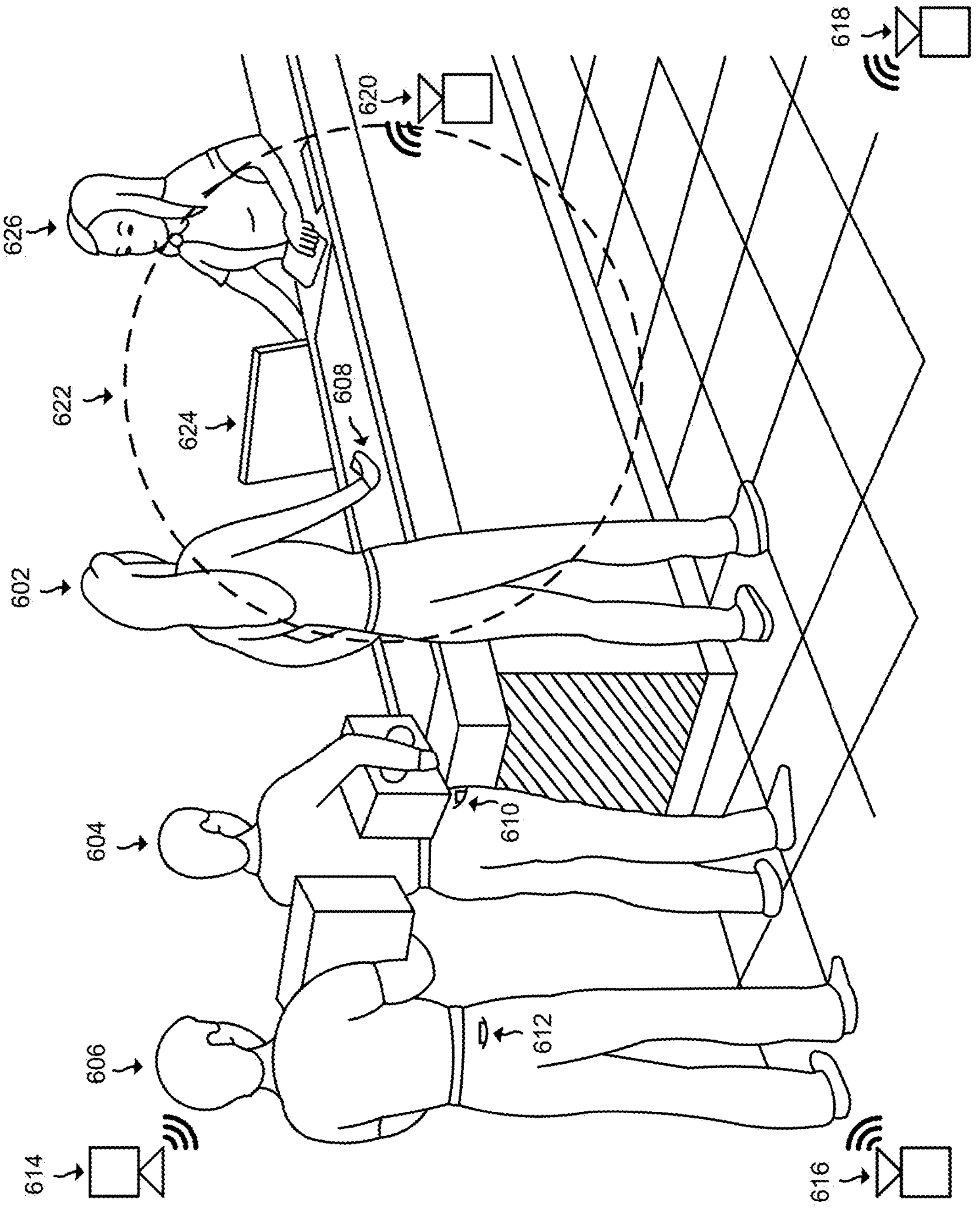
FIG. 6 shows a first exemplary application of a secure data transfer system according to some embodiments.
Figure 7:
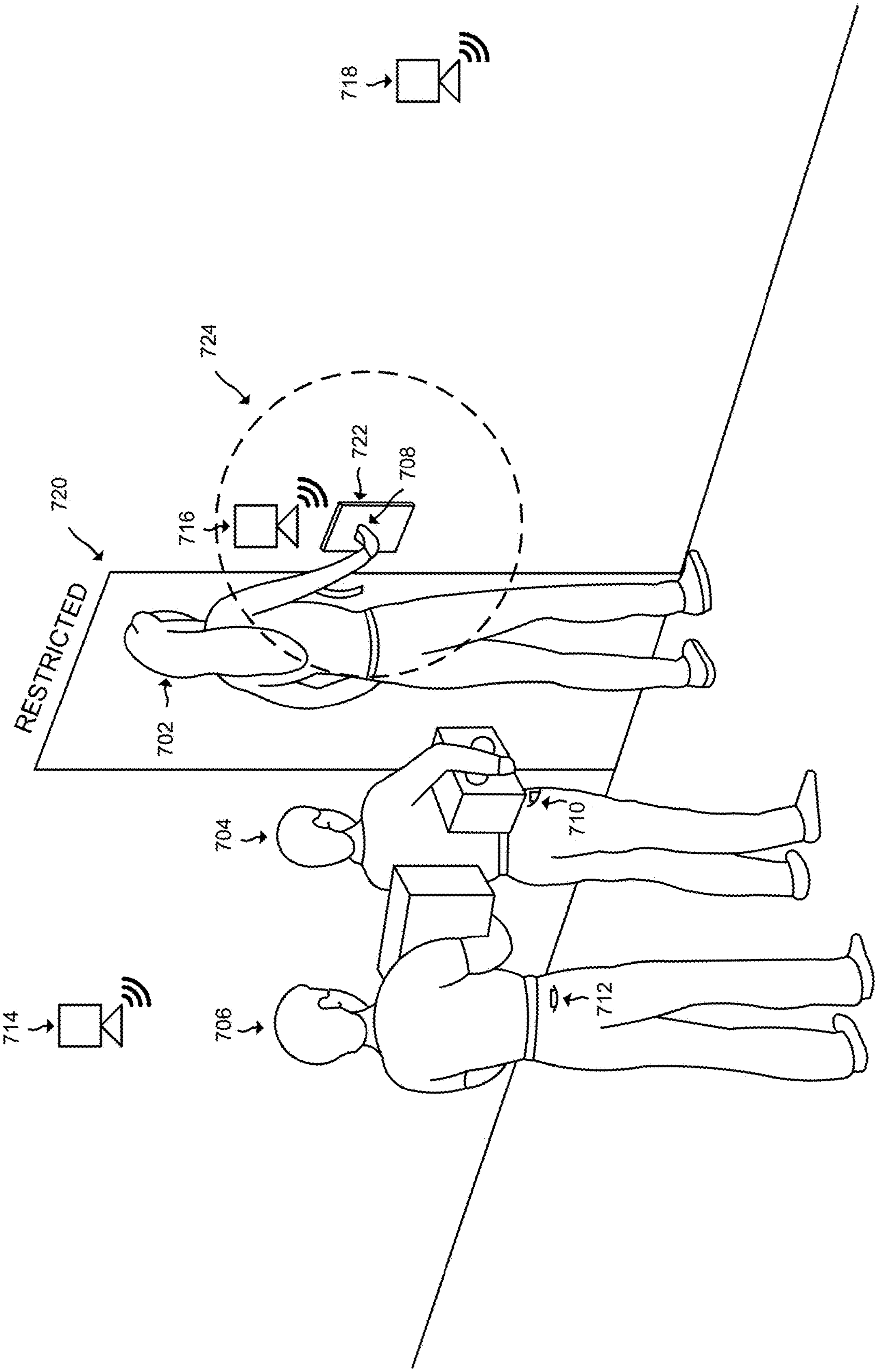
FIG. 7 shows a second exemplary application of a secure data transfer system according to some embodiments.

Having described an exemplary method according to some embodiments, it may be useful to describe some exemplary applications or use cases of embodiments in detail with reference to FIGS. 6 and 7. As a first example, embodiments of the present disclosure can be used to determine if a payment device (such as a smartphone) is actually present when it is used to make a transaction (e.g., by performing a data transmission that includes payment information). FIG. 6 shows a first exemplary use case involving a checkout line at a retail store.

The scene shown in FIG. 6 includes three customers 602-606, each possessing their own respective mobile device 608-612. FIG. 6 also shows a base station network comprising several base stations 614-620, which may be spread throughout a retail store. An employee 626 may operate an access device or resource provider computer 624. A destination area 622 may be define near the access device or resource provider computer 624 (e.g., a POS terminal 624). In larger retail stores, comprising multiple checkout lanes, multiple destination areas may be defined, each corresponding to a particular checkout lane. When a customer such as customer 602 wants to check out and complete their purchases, they may use their respective mobile device to transfer a payment credential (such as a payment token) to the access device or resource provider computer 624. This payment token can be used to complete a transaction. Embodiments of the present disclosure can be used to verify that the customer's mobile device is actually present, and that the customer is not the victim of a relay attack.

The mobile devices 608-612 may each be in periodic communication with one or more base stations in the base station network. Communication between a mobile device and the base station network may have begun when the mobile device entered the retail store. These communications may include the transmission of random identifiers generated and assigned (to each respective mobile device) by the base station network, as described above. These random identifier can be periodically regenerated and reassigned to the mobile devices, e.g., every 20 minutes. The mobile devices 608-612 and the base stations 614-620 may communicate with one another using UWB technology. A base station controller may coordinate the base stations, e.g., assigning particular base stations to communicate with particular mobile devices, scheduling transmissions, random identifier assignments, etc.

When customer 602 is ready to check out and complete their purchase, they may approach the front of the checkout line and the employee 626. In doing so, their respective mobile device 608 may enter the destination area 622. The base station network can determine that the mobile device 608 has entered the destination area 622 in a number of ways. For example, the base station network can determine that the mobile device 608 has entered the destination area because it has entered into the communication range of a base station near the destination area (e.g., base station 620). Alternatively, multiple base stations can periodically determine the distance between the mobile device 608 and each base station, and use these distance measurements to determine whether the mobile device 608 is in the destination area, using geometric methods such as triangulation.

One the base station network has determined that the mobile device 608 has entered the destination area 622, the base station network can transmit a message to POS terminal 624. This message can indicate to the POS terminal 624 that a payment transaction may be about to take place between the POS terminal 624 and the mobile device 626. It may also issue a visual or audible alert to the employee 626 to this effect.

Before performing the transaction however, the mobile device 608 and a base station may perform a distance measurement. This distance measurement can be used in order to determine whether the mobile device 608 is actually present in the destination area 622, preventing a potentially fraudulent transaction. The distance measurement can be performed with a relatively proximate base station, such as base station 620.

The mobile device 608 and the base station 620 can generate an ultra-wideband mobile session number (UMSN) and an ultra-wideband base session number (UBSN) respectively. The mobile device 608 and base station 620 can generate their respective session numbers using, for example, a random or pseudorandom number generator.

Afterwards, the mobile device 608 and the base station 620 can perform a double-sided two-way ranging procedure using the UMSN and UBSN. For example, the mobile device 608 and the base station 620 can perform a symmetric double sided two-way ranging (SDS-TWR) protocol, a SDS-TWR with multiple acknowledgement (SDS-TWR-MA), or any other appropriate double-sided two-way ranging protocol, for example, as described above or as identified in Mikhaylov et al. "Impact of IEEE 802.15.4 communication settings on performance in asynchronous two way UWB ranging".

In an exemplary generalized double-sided two-way ranging protocol, the base station 620 can transmit a first transmission comprising a UWB frame containing the UBSN to the mobile device 608. The mobile device 608 can respond with a second transmission comprising a UWB frame containing the UMSN, along with a processing delay value. The processing delay value can correspond to the amount of time between when the mobile device 608 received the first transmission and when the mobile device 608 transmitted the second transmission.

The base station 620 can determine the total "round time" from between when the base station sent the first transmission and received the second transmission. Using the processing delay value and the round time, the base station 620 can determine the propagation delay value. Using the propagation delay value, the speed of light, and the velocity factor of air, the base station 620 can accurately determine the distance between the base station 620 and the mobile device 608.

Afterwards, the base station 620 can transmit a third transmission to the mobile device 608. The third transmission can comprise an additional processing delay value corresponding to the amount of time from when the base station received the second transmission and transmitted the third transmission. Using the additional processing delay value and an additional round time value, the mobile device 608 can determine the propagation delay. Using the propagation delay, the speed of light, and the velocity factor of air, the mobile device 608 can accurately determine a distance measurement corresponding to the distance between the base station 620 and the mobile device 608.

At this point, the base station 620 (and/or the base station controller) and the mobile device 608 can each possess their own respective distance measurement, the UBSN, the UMSN, and the random identifier associated with the mobile device 608. The access device 624, the mobile device 608, and/or the base station 620 can use this information to verify that (1) the mobile device 608 performed the distance measurement process (instead of, e.g., a fraudulent device impersonating the mobile device and performing the distance measurement), (2) the mobile device 608 is within the destination area 622 or within a certain range of the base station 620, and (3) the distance measurements produced by the mobile device 608 and the base station 620 are consistent.

The mobile device 608 and the base station 620 can, for example, each compare their respective distance measurement to a predetermined distance threshold, in order to verify that the mobile device 608 is present in the destination area 622. Additionally or alternatively, the mobile device 608 and the base station can each generate their own respective cryptogram or data element containing the distance measurements, UMSN, UBSN, device identifier, etc. The mobile device 608 and the base station 620 can each transmit their respective cryptograms and data elements to the access device 624. The mobile device 608 can perform its transmission via a UWB, NFC, or a Bluetooth® transceiver, while the base station 620 can perform its transmission via a base station controller or another suitable means. The mobile device 608 may include payment information, such as an account identifier (e.g., a payment account number) in its transmission, in order to enact payment between the customer 602 and the retail store.

The access device 624 can subsequently evaluate the information contained in each of these transmissions. For example, the access device 624 can compare two cryptograms in order to verify that the mobile device 608 and the base station 620 produced consistent distant measurements, that both devices reported the same UBSN and UMSN, etc. The access device 624 can also verify that the distance measurements do not exceed a predetermined threshold value.

Afterwards, the access device 624 can generate an authorization request message and transmit it to an authorization computer via a processing network computer. The authorization computer may comprise a computer system associated with an issuing bank that maintains a financial account on behalf of the customer 602. The access device 624 can receive an authorization response message, indicating whether the transaction has been approved or declined. If the transaction has been approved, the employee 626 can provide the customer 602 with the goods that the customer 602 purchased.

As a second example, embodiments of the present disclosure can also be used in access control based application. For example, some embodiments can be used to improve the security of systems used to control physical access to buildings (such as schools, government offices) or vehicles, by verifying that a mobile device used to access physical space (e.g., a key fob or smart ID card) is actually present when it is used to access the space. FIG. 7 shows a second exemplary use case involving access to a restricted building via an electronically locked door.

The scene shown in FIG. 7 includes three users 702-706, each possessing their own respective mobile device 708-712. These mobile devices may comprise devices such as smart ID cards, smart phones, smart watches, PDAs, etc. FIG. 7 also shows a base station network comprising base stations 714-718, which may be spread around the general area, such as in different locations on a wall of the restricted building. An access device 722 may be adjacent to an electronically locked door 720. Around this access device 722, a "destination area" 724 may be defined.

In such systems, typically a user (such as user 702) approaches the electronically locked door 720, and presents their mobile device (e.g., mobile device 708) to the access device 722. The access device 722 and the mobile device 708 can communicate such that a credential is transmitted from the mobile device 708 to the access device 722. The access device 722 can verify the credential and (provided the user 702 is authorized to access the restricted building) unlock the electronically locked door. However, conceivably a fraudster, impersonating user 702 could approach the access device 722 using their mobile device. The fraudster's mobile device could be part of an electronic relay between the legitimate user's 702 mobile device 708, and the access device 722. The legitimate user's 702 mobile device 708 could unknowingly transmit its credential to the access device, via the fraudster's mobile device, granting the fraudster access to the restricted building.

To address this problem, embodiments of the present disclosure can be used to verify that a user's mobile device is actually present when the mobile device is communicating with the access device 722. This prevents the possibility of relay attacks and thus improves the security of the system.

The mobile devices 708-712 may each be in periodic communication with one or more base stations in the base station network. Communication between a respective mobile device and the base station network may have begun when the mobile device entered the communication range of one or more base stations in the base station network. These communications may include the transmission of random identifiers, generated and assigned (to each respective mobile device) by the base station network as described above. The random identifiers can be periodically regenerated and reassigned to the mobile devices, e.g., every 20 minutes. The mobile devices 708-712 and the base stations 714-718 can communicate with one another using UWB technology. A base station controller may coordinate the base stations, i.e., assigning particular base stations to communicate with particular mobile devices, scheduling transmissions, random identifier assignments, etc.

When a user 702 is ready to enter the access controlled building via electronically locked door 720, the user 702 can approach the electronically locked door 720 and the access device 722 with their mobile device 708. In doing so, their mobile device 708 may enter the destination area 724. The base station network can determine that the mobile device 708 has entered the destination area in a number of ways. For example, the base station network can determine that the mobile device 708 has entered the destination area because it has entered into the communication range of a base station near the destination area (e.g., base station 716). Alternatively, multiple base stations can periodically determine the distance between the mobile device 708 and each base station, and use these distance measurements to determine whether the mobile device 708 is in the destination area, using geometric methods such as triangulation.

Once the base station network has determined that the mobile device 708 has entered the destination area 724, the base station network can transmit a message to access device 722, indicating that the access device 722 can expect a data transfer from the mobile device 708. This data transfer may comprise an access token or another identifier that can be used by the access device 722 to verify the user's 702 identity and grant the user 702 access to the building.

Before performing the data transfer however, the mobile device 708 and a base station may perform a distance measurement. This distance measurement can be used in order to determine whether the mobile device 708 is actually present in the destination area 722, preventing a potential fraudster from accessing the access controlled building. The distance measurement can be performed with a relatively proximate base station, such as base station 716.

The mobile device 708 and the base station 716 can generate an ultra-wideband mobile session number (UMSN) and an ultra-wideband base session number (UBSN) respectively. The mobile device 708 and the base station 716 can generate their respective session numbers using, for example, a random or pseudorandom number generator.

Afterwards, the mobile device 708 and the base station 716 can perform a double-sided two-way ranging procedure using the UMSN and UBSN. For example, the mobile device 708 and the base station 716 can perform an SDS-TWR protocol, an SDS-TWR-MA protocol, or any other appropriate double-sided two-way ranging protocol, as described above.

In an exemplary generalized double-sided two-way ranging protocol, the base station 716 can transmit first transmission comprising a UWB frame containing the UBSN to the mobile device 708. The mobile device 708 can respond with a second transmission comprising a UWB frame containing the UMSN, along with a processing delay value. The processing delay value can correspond to the amount of time between when the mobile device 708 received the first transmission and when the mobile device 708 transmitted the second transmission.

The base station 716 can determine the total "round time" from between when the base station sent the first transmission and received the second transmission. Using the processing delay value and the round time, the base station 716 can determine the propagation delay. Using the propagation delay value, the speed of light, and the velocity factor of air, the base station 716 can accurately determine the distance between the base station 716 and the mobile device 708.

Afterwards, the base station 716 can transmit a third transmission to the mobile device 708. The third transmission can comprise an additional processing delay value corresponding to the amount of time from when the base station received the second transmission and transmitted the third transmission. Using the additional processing delay value and an additional round time value, the mobile device 708 can determine the propagation delay. Using the propagation delay, the speed of light, and the velocity factor of air, the mobile device 708 can accurately determine a distance measurement corresponding to the distance between the base station 716 and the mobile device 708.

At this point, the base station 716 (and/or the base station controller) and the mobile device 708 can each possess their own respective distance measurement, the UBSN, the UMSN, and the random identifier associated with the mobile device 708. The access device 722, the mobile device 708, and/or the base station 716 can use this information to verify that (1) the mobile device 708 performed the distance measurement process (instead of, e.g., a fraudulent device impersonating the mobile device 708 and performing the distance measurement, (2) the mobile device 708 is within the destination area 724 or within a certain range of the base station 716, and (3) the distance measurements produced by the mobile device 708 and the base station 716 are consistent.

The mobile device 708 and the base station 716 can, for example, each compare their respective distance measurement to a predetermined distance threshold, in order to verify that the mobile device 708 is present in the destination area 724. Additionally or alternatively, the mobile device 708 and the base station 716 can each generate their own respective cryptogram or data element containing the distance measurements, UMSN, UBSN, device identifier, etc.

The mobile device 708 and the base station 716 can each transmit their respective cryptograms and data elements to the access device 722. The mobile device 708 can perform its transmission via a UWB, NFC, or a Bluetooth® transceiver, while the base station 716 can perform its transmission via a base station controller or another suitable means. The mobile device 708 may include a credential such as an access token in its transmission, in order to prove that the user 702 has access to the restricted building.

The access device 722 can subsequently evaluate the information contained in each of these transmissions. For example, the access device 722 can compare two cryptograms in order to verify that the mobile device 708 and the base station 716 produced consistent distance measurements, that both devices reported the same UBSN and UMSN, etc. The access device 722 can also verify that the distance measurements do not exceed a predetermined distance threshold. Additionally, the access device 722 can verify that a credential (such as an access token) included in the transmission from the mobile device 708 is valid and that the corresponding user 702 has access to the restricted building.

Afterwards, provided the credential is valid and the user 702 is authorized to access the restricted building, the access device 722 can transmit a signal to the electronically locked door 720, causing the electronically locked door 720 to unlock and grant access to the user 702.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can include computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A base station comprising:

a processor; and a computer readable medium, the computer readable medium comprising code, executable by the processor for performing a method comprising:

transmitting to a mobile device, a first transmission comprising a first session identifier;

receiving from the mobile device, a second transmission comprising a second session identifier and a first processing time value;

generating a first distance measurement corresponding to a distance between the mobile device and the base station using the first processing time value;

transmitting to the mobile device, a third transmission, wherein the mobile device generates a second distance measurement corresponding to the distance between the mobile device and the base station;

generating a data element using the first distance measurement, and one or more of the first session identifier, the second session identifier, and/or a mobile device identifier corresponding to the mobile device; and transmitting the data element to an access device, wherein the access device receives a fourth transmission comprising a first cryptogram generated by the mobile device using the second distance measurement, and one or more of the first session identifier, the second session identifier, and/or the mobile device identifier, and wherein the access device validates the first cryptogram using the data element.

2. The base station of claim 1, wherein in the method prior to transmitting the first transmission to the mobile device, the method further comprises:

determining a location associated with the mobile device by performing a locating process with a plurality of other base stations in a base station network;

determining that the mobile device is in a destination area based on the location associated with the mobile device; and transmitting, to the access device, a message indicating that the mobile device is in the destination area.

3. The base station of claim 1, wherein the method further comprises: receiving an initial transmission comprising the mobile device identifier, the initial transmission indicating that the mobile device has entered a destination area.

4. The base station of claim 1, wherein the method further comprises:

comparing the first distance measurement to a predetermined distance threshold; and transmitting, a warning message to the access device, the warning message indicating that the first distance measurement exceeds the predetermined distance threshold.

5. The base station of claim 1, wherein the base station and the mobile device communicate via an ultra-wideband communication channel.

6. A method comprising:

receiving, by an access device from a base station, a data element generated using a first distance measurement, and one or more of a session identifier and/or a mobile device identifier corresponding to a mobile device;

receiving, by the access device from the mobile device, an account identifier and a first cryptogram;

verifying, by the access device, the first cryptogram using the account identifier and data in the data element;

generating, by the access device, an authorization request message comprising the account identifier; and transmitting, by the access device, the authorization request message to an authorization computer for authorization.

7. The method of claim 6, wherein the first cryptogram is generated using a second distance measurement, and wherein the method further comprises, before generating the authorization request message:

obtaining, by the access device, the second distance measurement from the first cryptogram; and comparing, by the access device, the first distance measurement and the second distance measurement to a threshold to determine if a relay attack is occurring.

8. The method of claim 7, wherein the first distance measurement and the second distance measurement are distances between the mobile device and the base station.

9. The method of claim 8, wherein the first distance measurement and the second distance measurement were obtained using a ultrawideband communication channel.

10. The method of claim 6, wherein the authorization request message further comprise an amount.

11. The method of claim 6, wherein the authorization request message further comprises the first cryptogram.

12. The method of claim 6, wherein the data element is generated using the first distance measurement, the session identifier and the mobile device identifier.

13. The method of claim 6, wherein the session identifier is a nonce.

14. The method of claim 6, wherein the method further comprises:

receiving, by the access device, a message from the base station indicating that the mobile device is in a destination area.

15. The method of claim 6, wherein the mobile device is a mobile phone.

16. An access device comprising:

a processor; and a computer readable medium comprising code, executable by the processor, for performing a method comprising:

receiving, from a base station, a data element generated using a first distance measurement, and one or more of a session identifier and/or a mobile device identifier corresponding to a mobile device, receiving, from the mobile device, an account identifier and a first cryptogram, verifying the first cryptogram using the account identifier and data in the data element, generating an authorization request message comprising the account identifier, and transmitting the authorization request message to an authorization computer for authorization.

17. The access device of claim 16, wherein the access device is a POS terminal.

18. The access device of claim 16, wherein the authorization request message comprises an amount and the first cryptogram.

19. The access device of claim 16, wherein the first cryptogram is verified by creating a second cryptogram and comparing the first cryptogram with the second cryptogram.

20. The access device of claim 16, wherein the method further comprises:

receiving, by the access device, a message from the base station indicating that the mobile device is in a destination area.

* * * * *